United States Patent
Mazzola et al.

(10) Patent No.: US 10,176,717 B2
(45) Date of Patent: Jan. 8, 2019

(54) SYSTEMS AND METHODS FOR DETECTING VEHICLE MOVEMENTS

(71) Applicant: Pied Parker, Inc., Palo Alto, CA (US)

(72) Inventors: Robert Mazzola, Palo Alto, CA (US); Gianni Rosas-Maxemin, Palo Alto, CA (US); Francisco Sandoval, Palo Alto, CA (US)

(73) Assignee: Pied Parker Inc., Palo Alto, CA (US)

( * ) Notice: Subject to any disclaimer, the term of this patent is extended or adjusted under 35 U.S.C. 154(b) by 0 days.

(21) Appl. No.: 15/885,375

(22) Filed: Jan. 31, 2018

(65) Prior Publication Data

US 2018/0286236 A1  Oct. 4, 2018

Related U.S. Application Data

(60) Provisional application No. 62/480,450, filed on Apr. 2, 2017, provisional application No. 62/480,441, filed on Apr. 1, 2017.

(51) Int. Cl.
*G08G 1/0968* (2006.01)
*G01C 21/36* (2006.01)
*G01C 21/34* (2006.01)

(52) U.S. Cl.
CPC ..... *G08G 1/096838* (2013.01); *G01C 21/3492* (2013.01); *G01C 21/3664* (2013.01); *G08G 1/096888* (2013.01)

(58) Field of Classification Search
None
See application file for complete search history.

(56) References Cited

U.S. PATENT DOCUMENTS

| | | | | |
|---|---|---|---|---|
| 8,063,797 B1* | 11/2011 | Sonnabend | ........ | G06K 9/00791 340/932.2 |
| 9,177,475 B2* | 11/2015 | Sellschopp | ........ | G01C 21/3484 |
| 9,666,073 B1* | 5/2017 | Lin | ........ | G08G 1/141 |
| 9,947,221 B1* | 4/2018 | Mazzola | ........ | G08G 1/096783 |
| 2002/0109610 A1* | 8/2002 | Katz | ........ | G07B 15/02 340/932.2 |
| 2009/0082950 A1* | 3/2009 | Vorona | ........ | G08G 1/0104 701/119 |
| 2011/0184640 A1* | 7/2011 | Coleman | ........ | G01C 21/3492 701/533 |

(Continued)

*Primary Examiner* — Navid Ziaeianmehdizadeh
(74) *Attorney, Agent, or Firm* — Zheng Liu; Weintraub Tobin

(57) ABSTRACT

Vehicular movement detection systems and methods are disclosed. A computing device is configured to monitor sensor data and location data associated with a first user device including one or more sensors, and monitor traffic data associated with a location of the first user device based on the sensor data and location data. In response to the data, the computing device determines whether to provide a user-selectable message to the first user device based on a vehicle speed, proximity to a destination, and vehicle speed relative to traffic speed. The user-selectable message comprises a prompt configured to transmit a search request for a listing location. In response to the determination, the user-selectable message is provided to the first user device. In response to receiving a search request, the computing device is configured to transmit instructions to the first user device to direct the first user device to a first listing location.

20 Claims, 11 Drawing Sheets

(56) References Cited

U.S. PATENT DOCUMENTS

| | | | |
|---|---|---|---|
| 2017/0083025 A1* | 3/2017 | Rosas-Maxemin | G07B 15/02 |
| 2017/0138752 A1* | 5/2017 | Mermelstein | G01C 21/3484 |
| 2017/0313305 A1* | 11/2017 | Irion | B60W 30/06 |
| 2018/0047288 A1* | 2/2018 | Cordell | G08G 1/096888 |

* cited by examiner

SYSTEMS AND METHODS FOR DETECTING VEHICLE MOVEMENTS

CROSS-REFERENCE TO RELATED APPLICATIONS

The present application claims the benefit of U.S. Provisional Application No. 62/480,441 filed on Apr. 1, 2017, and claims the benefit of U.S. Provisional Application No. 62/480,450 filed on Apr. 2, 2017. The above-identified patent applications are hereby incorporated by reference in their entireties.

TECHNICAL FIELD

The present disclosure relates generally to detecting vehicle movements, and more specifically, to generating search requests for listing locations in response to detecting vehicle movements using wireless devices.

BACKGROUND

Parking a vehicle in densely populated environments is often a frustrating and time-consuming experience, with few available parking spaces and major street congestion. This is especially true in populated urban environments such as the downtowns of large municipalities (e.g., New York City, San Francisco, etc.). Moreover, parking is often in demand near destinations or event venues such as neighborhoods surrounding sports stadiums, concert halls, amusement parks, or beachfronts.

Additionally, the high price of real estate has motivated many property owners to seek out non-traditional ways for property owners to monetize their real property assets. For example, homeowners can often rent out rooms in their homes to tourists or travelers using an online home rental platform; car drivers can provide taxi services using their personal vehicle to pedestrians using a ride sharing platform.

With traditional booking systems, a user may manually search for parking when close to a destination. The user may try to circle the block and find a spot without the aid of a smartphone, or, attempt to use a smartphone to select a suitable parking space. However, with those systems, it may be either dangerous or illegal for a vehicle operator to attempt to manually search for parking on a smartphone, and the user may have to pull over. Moreover, with those systems, circling the block for parking adds significantly to congestion, with as much as 30% of traffic being caused by vehicle operators looking for parking.

SUMMARY

A vehicle movement detection system and methods of operation are disclosed. According to one embodiment, a system includes a non-transitory memory and one or more processors coupled thereto. The one or more processors are configured to execute instructions comprising: monitoring location and sensor data associated with a first user device; monitoring traffic data associated with a location of the first user device based on the location and sensor data; determining whether to provide a user-selectable message to the first user device based on a vehicle speed, proximity to a destination, and vehicle speed relative to traffic speed, the user-selectable message comprising a prompt configured to transmit a search request for a listing location of one or more listing locations; providing the user-selectable message on the first user device; receiving a search request in response to the user-selectable message, the search request including search parameters associated with the one or more listing locations; and transmitting instructions to the first user device to direct the first user device to a first listing location of the one or more listing locations. According to another embodiment, the user-selectable message includes a deep link. According to yet another embodiment, the deep link may be activated by audio confirmation or touch of a display of the first user device. According to yet another embodiment, the determination whether to provide a user-selectable message on the first user device is based on machine learning and artificial intelligence. According to yet another embodiment, the determination whether to provide a user-selectable message on the first user device is further based on a frequency of braking and a frequency of turning. According to yet another embodiment, the determination to provide a user-selectable message on the first user device is based on a plurality of factors, the plurality of factors being weighed based on a driver profile or historical data.

According to another embodiment, a computer-implemented method for determining when a vehicle operator is searching for a listing location, comprises monitoring, using one or more processors coupled to a non-transitory memory, sensor data and location data associated with a first user device, the first user device including one or more sensors; monitoring traffic data associated with a location of the first user device based on the sensor data and location data; determining whether to provide a user-selectable message on the first user device based on a vehicle speed, proximity to a destination, and vehicle speed relative to traffic speed, the user-selectable message comprising a prompt configured to transmit a search request for a listing location of one or more listing locations; providing the user-selectable message on the first user device; receiving a search request in response to the user-selectable message, the search request including search parameters associated with the one or more listing locations; and transmitting instructions to the first user device to direct the first user device to a first listing location of the one or more listing locations. According to another embodiment, the user-selectable message includes a deep link. According to yet another embodiment, the deep link may be activated by audio confirmation or touch of a display of the first user device. According to yet another embodiment, the determination whether to provide a user-selectable message on the first user device is based on machine learning and artificial intelligence. According to yet another embodiment, the determination whether to provide a user-selectable message on the first user device is further based on a frequency of braking and a frequency of turning. According to yet another embodiment, the user-selectable message provided to the first user device is a notification, alert, update, text message, or chime. According to yet another embodiment, the determination to provide a user-selectable message on the first user device is further based on a vehicle speed relative to an average traffic speed and a posted speed limit, the posted speed limit corresponding with a speed limit on a direction of travel of the first user device.

According to yet another embodiment, a system includes a non-transitory memory and one or more processors coupled thereto. The one or more processors are configured to execute instructions comprising: monitoring location and sensor data associated with a first user device; monitoring traffic data associated with a location of the first user device based on the location and sensor data; providing the user-selectable message on the first user device based on a vehicle speed, proximity to a destination, and vehicle speed relative to traffic speed, the user-selectable message comprising a prompt configured to transmit a search request for a listing location of one or more listing locations; transmitting a search request in response to activation of the prompt, the search request including search parameters associated with listing locations; and providing the first user device with instructions to direct to a first listing location of the one or more listing locations. According to yet another embodiment, the user-selectable message includes a deep link. According to yet another embodiment, the deep link may be activated by audio confirmation or touch of a display of the first user device. According to yet another embodiment, the search parameters include one or more of a user rating, a price range, a time range, a type of listing location, and proximity of availability time to a current time. According to yet another embodiment, the determination to provide a user-selectable message on the first user device is further based on a frequency of braking and a frequency of turning. According to yet another embodiment, the determination to provide a user-selectable message on the first user device is further based on whether a weighted sum of factors associated with vehicular movement exceeds a threshold.

In the figures, elements having the same designations have the same or similar functions.

DETAILED DESCRIPTION

Using shared economy parking applications, smartphone owners can use on-demand parking systems to pay property owners for use of their parking space(s). However, applications rely on user input to book parking spaces, determine arrival and departure of vehicles in parking spaces and/or rely upon expensive sensors. Accordingly, it would be desirable to provide improved methods and systems of providing options to automatically reserve parking spaces and improved methods and systems of detecting vehicle movements.

The foregoing problems are addressed by aspects of the subject technology that provide systems and methods for identifying situations in which a user device is looking for parking, and then send a user-selectable message that provides a prompt configured to transmit a search request.

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative, but not limiting. Phrases including "such as" and "for example" are intended to be non-exclusive, and not limit embodiments to the set of things listed within those phrases. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, a media device may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, a media device may be a personal computer, a portable digital assistant (PDA), a consumer electronic device, a display device or monitor, a smartphone, or any other suitable device and may vary in size, shape, performance, functionality, and price. The media device may include memory, one or more processing resources such as a central processing unit (CPU) or hardware or software control logic. Additional components of the media device may include one or more storage devices, one or more communications ports for communicating with external devices as well as various input and output (I/O) devices, such as a keyboard, a mouse, a touchscreen, button inputs, a microphone, a motion sensor, and/or a video display.

Figure 1:
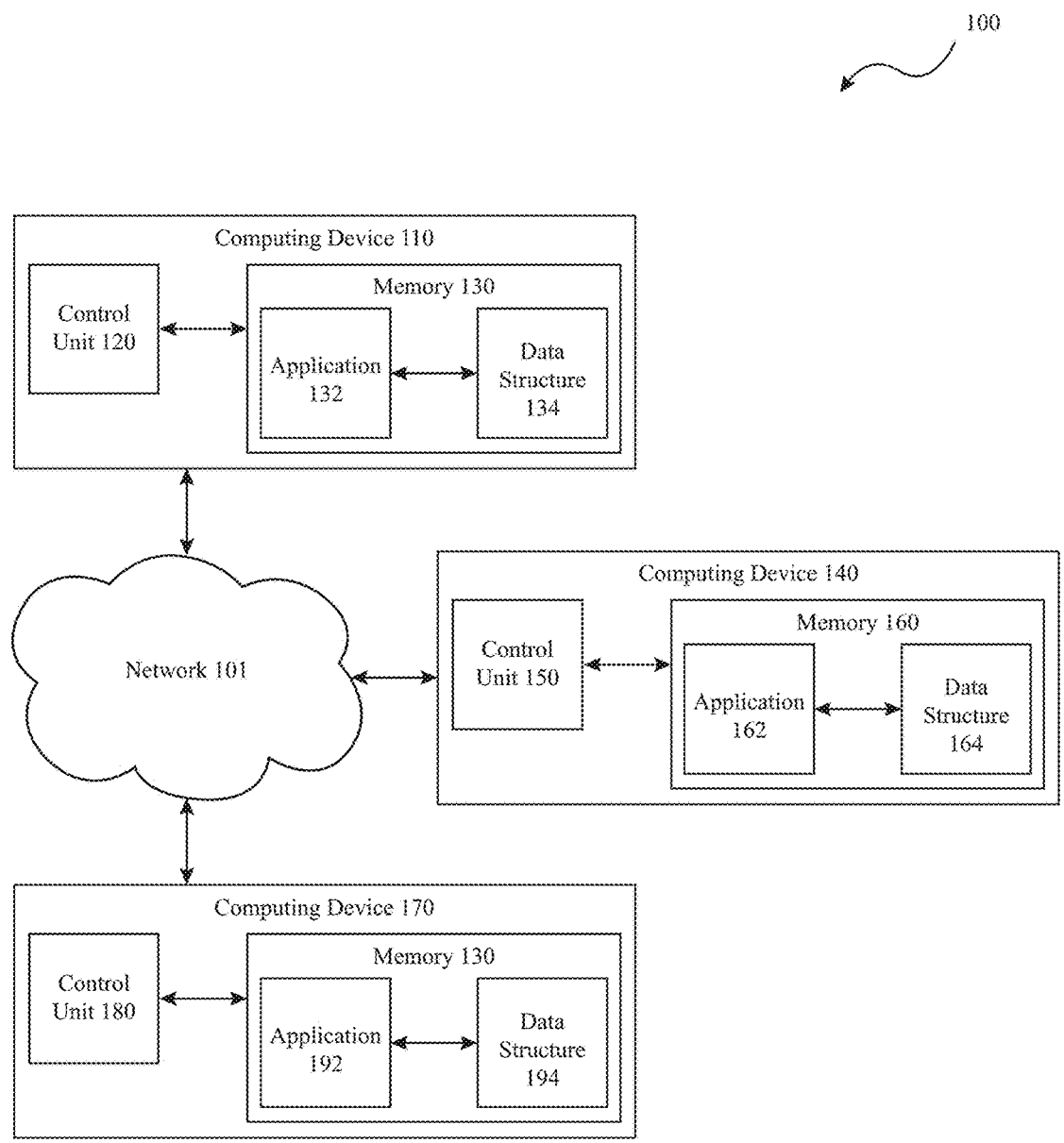
FIG. 1 is an example diagram of a distributed computing system according to some embodiments.

FIG. 1 is a simplified diagram of a distributed computing system 100 according to some embodiments. As shown in FIG. 1, system 100 includes three computing devices 110, 140, and 170. One of ordinary skill would appreciate that distributed computing system 100 may include any number of computing devices of various types and/or capabilities. In some embodiments, computing devices 110, 140, and/or 170 may be any type of computing device including personal computers (e.g., laptop, desktop, smartphone, or tablet computers), servers (e.g., web servers, database servers), network switching devices (e.g. switches, routers, hubs, bridges, and/or the like), vehicle-based devices (e.g., on-board vehicle computers, short-range vehicle communication systems, telematics devices), or mobile communication devices (e.g., mobile phones, portable computing devices, and/or the like), and/or the like, and may include some or all of the elements previously mentioned.

In some embodiments, computing device 110 includes a control unit 120 coupled to memory 130; computing device 140 includes a control unit 150 coupled to memory 160; and computing device 170 includes a control unit 180 coupled to memory 190. Each of control units 120, 150, and/or 180 may control the operation of its respective computing device 110, 140, and/or 170. In some examples, control units 120, 150, and/or 180 may each include one or more processors, central processing units (CPUs), graphical processing units (GPUs), virtual machines, microprocessors, microcontrollers, logic circuits, hardware finite state machines (FSMs), digital signal processors (DSPs) application specific integrated circuits (ASICs), field programmable gate arrays (FPGAs), and/or the like and/or combinations thereof. In some examples, memory 130 may be used to store one or more applications and one or more data structures, such as an application 132 and data structure 134. In some examples, memory 160 may be used to store one or more applications and one or more data structures, such as an application 162 and data structure 164, and memory 190 may be used to store one or more applications and one or more data structures, such as an application 192 and data structure 194.

In some embodiments, memories 130, 160, and/or 190 may each include one or more types of machine-readable media, including volatile and non-volatile memory. Some common forms of machine-readable media may include floppy disk, flexible disk, hard disk, magnetic tape, any other magnetic medium, CD-ROM, any other optical medium, punch cards, paper tape, any other physical medium with patterns of holes, ROM, PROM, EPROM, FLASH-EPROM, any other memory chip or cartridge, and/or any other medium from which a processor or computer is adapted to read. Some common forms of volatile memory include SRAM, DRAM, IRAM, and/or any other type of medium which retain data while devices are powered, potentially losing the memory when the devices are not powered.

The data structures 134, 164, and/or 194 may vary in size, usage, and/or complexity depending upon the purposes of computing devices 110, 140, and/or 170 and/or applications 132, 162, and/or 192. In some embodiments, when computing devices 110, 140, and/or 170 are network switching devices, such as switches, routers, hubs, bridges, and/or the like, the data structures 134, 164, and/or 194 may include one or more tables with forwarding and/or similar information. In some examples, these tables may include one or more virtual local area network (LAN) tables, link aggregation group (LAG) tables, layer 2 (L2) next hop tables, layer 3 (L3) routing tables, L3 forwarding information bases (FIBs), flow tables, and/or the like. Depending upon the networking environment of system 100 and/or the role of computing devices 110, 140, and/or 170 these tables may include anywhere from a few dozen entries to thousands, or even tens of thousands or more entries. In some examples, data from data structures 134, 164, and/or 194 may be retrieved, stored, or modified by a respective control unit in accordance with instructions which may be executed directly, e.g., machine code, or indirectly, e.g., scripts, by the respective control unit. The systems and methods of the present disclosure are not limited to any particular data structure.

In some embodiments, computing devices 110, 140, and 170 may also be coupled together using a network 101. In some embodiments, one or more of computing devices 110, 140, and 170 may be connected via any type of wired or wireless connections, such as dedicated short-range communications (DSRC), satellite, radio-frequency identification (RFID), fire wire, network, USB, Wi-Fi, RFID, BLUETOOTH, near field communication (NFC), Infrared (e.g. GSM infrared), and/or the like and/or using any suitable wireless communication standards and protocols, such as IEEE 802.11 and WiMAX. Network 101, including any intervening nodes, may be any kind of network including a LAN such as an Ethernet, a wide area network (WAN) such as an internet, a virtual or non-virtual private network, and/or the like and/or combinations thereof.

In some embodiments, network 101 may include any type of computing device including personal computers (e.g., laptop, desktop, smartphone, or tablet computers), servers (e.g., web servers, database servers), network switching devices (e.g. switches, routers, hubs, bridges, and/or the like), vehicle-based devices (e.g., on-board vehicle computers, short-range vehicle communication systems, telematics devices), or mobile communication devices (e.g., mobile phones, portable computing devices, and/or the like), and/or the like, and may include some or all of the elements previously mentioned. Computing devices 110, 140, and 170 through their applications, such as applications 132, 162, and/or 192, may use network 101 to exchange information and/or to provide services for each other. In some examples, computing device 140 may be used to provide backup and/or fail over services for computing device 110. In some examples, computing device 140 may be maintaining data structure 164 as a synchronized copy of data structure 134. In some examples, one or more of components of computing devices 110, 140, and 170, such as a control unit, may be located remotely.

In some embodiments, computing devices 110, 140, and/or 170 may include an electronic display, the display may be an active matrix emitting diode (AMOLED), light-emitting diode (LED), organic LED (OLED), electrophoretic, liquid crystal, e-paper, and/or the like and/or combinations thereof.

In some embodiments, computing devices 110, 140, and/or 170 may include various input and output (I/O) devices, such as a keyboard, a mouse, touchscreen, button inputs, microphone, motion sensor, eye sensor, video display, and/or or the like.

Figure 2:
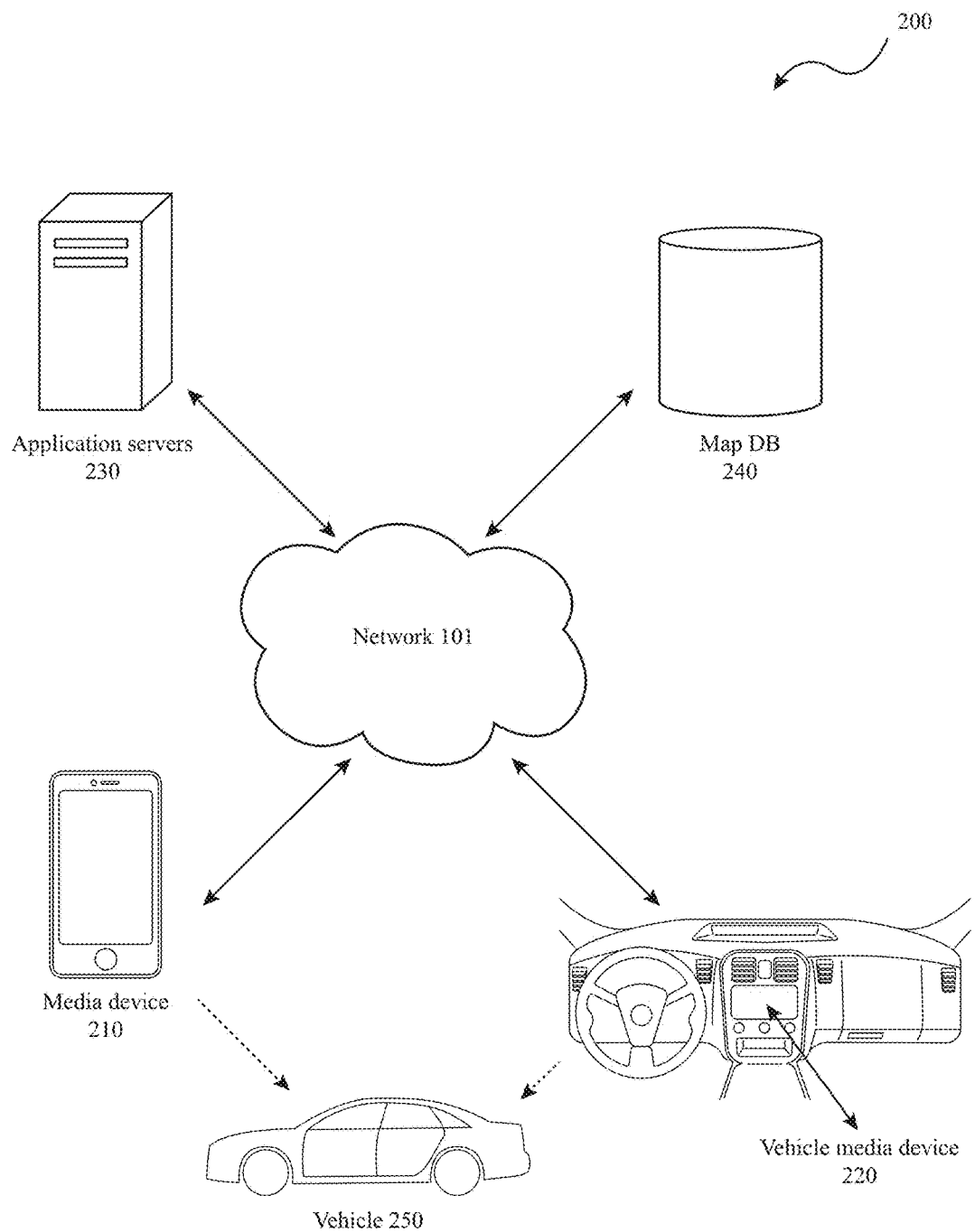
FIG. 2 is an example diagram of a distributed computing network according to some embodiments.

FIG. 2 is a simplified diagram of a distributed computing system 200. In some embodiments, as shown in FIG. 2, system 200 includes media device 210, vehicle media device 220, application servers 230, map database 240, and vehicle 250. In some examples, media device 210 and/or vehicle media device 220 may correspond to one or more of computing devices 110, 140, 170 and may be in communication with one another using network 101.

In some embodiments, vehicle media device 220 may be a device within vehicle 250, or may be part of the vehicle itself, such as an on-board vehicle computer. The vehicle may have more than one computing device. In some examples, vehicle media device 220 may be mounted inside a vehicle, such as to a dashboard of the vehicle. In some examples, the vehicle may be any type of vehicle, including a sedan, truck, SUV, motorcycle, scooter, self-balancing scooters (e.g., SEGWAY), hoverboard, drone, bus, golf cart, train, trolley, amusement vehicle, recreational vehicle, boat, watercraft, helicopter, airplane, bicycle, and/or the like.

In some embodiments, media device may include a display within a housing. In some examples, the housing may include several parts. In some examples, one part of the housing may include an optically transparent material, such as glass, and another part of the housing may include other materials, such as metallic materials, e.g., aluminum, and/or plastic, which may provide a robust support structure to prevent deformation of the display.

In some embodiments, vehicle media device 220 may establish communication with media device 210, or vice versa. In some examples, media device 210 automatically establishes communication with vehicle media device 220, such as by connections between one or more of computing devices 110, 140, and 170. In some examples, media device 210 is automatically in communication with vehicle media device 220 via wired connection. In some examples, media device 210 may contain its own power supply, or may be powered by a power supply within vehicle 250. In some examples, vehicle may charge media device 210 while in operation. In some examples, media device 210 may be charged wirelessly, e.g., on a wireless charging surface, such as on a dashboard of vehicle 250. Vehicle 250 may contain a transmitter for providing energy transmission and media device 210 may have a receiver for wireless power, whereby energy transfer occurs using magnetic resonant coupling. The transmitter may transmit power using multiple transmit coils and using parallel paths from such coils to multiple receive coils in the receiver.

In some embodiments, vehicle 250 may be remotely controlled, may be partially or totally autonomous, such as partially or totally autonomous vehicle systems and methods disclosed in U.S. Pat. No. 9,330,571, which is incorporated by reference in its entirety. In some examples, vehicle 250 may contain one or more vehicle operation sensors. In some examples, media device 210 and vehicle media device 220 may be included as vehicle operation sensors and may be configured to communicate with the one or more external sensors. External sensors may include cameras, lasers, sonar, radar detection units (e.g., ones used for adaptive cruise control), and/or the like and/or combinations thereof, and may provide data updated in real-time, updating output to reflect current environment conditions. Object detection and classification for autonomous vehicles may be performed according to embodiments disclosed in U.S. Pat. No. 8,195,394, which is incorporated by reference in its entirety.

In some embodiments, data may also be collected from other sources, including one or more application servers 230. In some examples, traffic data may be received by one or more application servers, which may include a geolocation, mapping, and navigation application such as GOOGLE MAPS, APPLE MAPS, WAZE, and/or the like and/or combinations thereof. In some examples, application servers 230 may interact with a map or a geographic information system (GIS) database, such as map database 240, through a map API such as the GOOGLE MAPS API. In some examples, the application servers query the map or GIS database for traffic data in response to receiving the sensor data from the media device and/or host device. In some examples, map database 240 may be an SQL database. The application servers 230 may interface with one or more servers managing the SQL database. Application data and application states may be stored in a cloud managed SQL database. In some examples, map database 240 may be a document-oriented database including a NoSQL database such as a MONGODB database.

Figure 3:
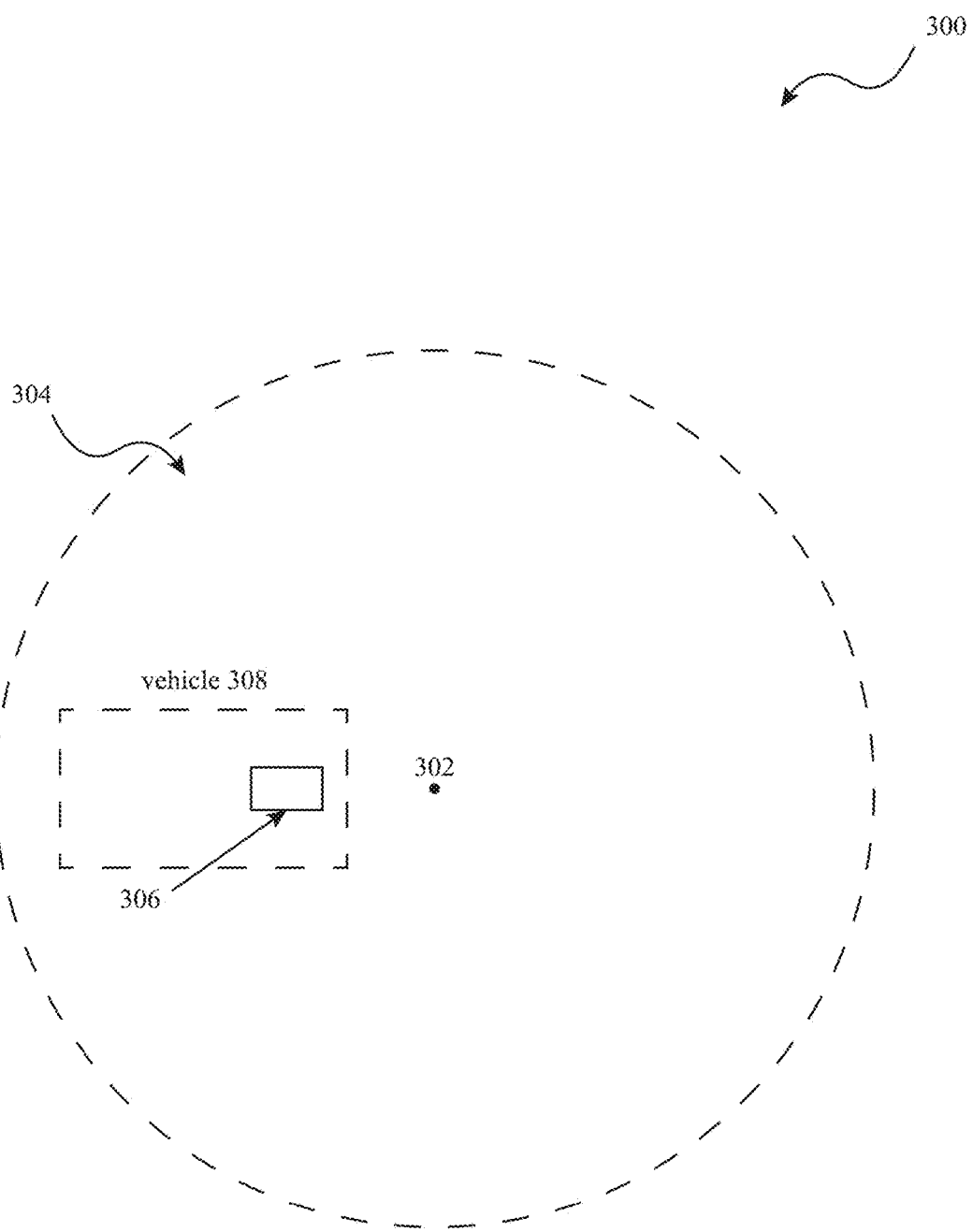
FIG. 3 is an example diagram of a wireless device detection system, including a geographic area with virtual boundaries.

FIG. 3 is an example diagram of a geographic area with virtual boundaries, which, when a wireless media device enters or departs such geographic area, it triggers the wireless media device to update associated listing location information. In some examples, a listing location may include any location that is made available (e.g., advertised) on a software application, including any real estate that may be available for temporary licensing, leasing, and/or the like, including a lot, garage (commercial or residential), and/or other location with a space suitable for parking a vehicle 308. In some examples, the vehicle may correspond with vehicle 250.

In some embodiments, a wireless media device 306 may enter or depart a geographic area 304. In some examples, wireless media device 306 may correspond to one or more of computing devices 110, 140, 170, media device 210, and/or vehicle media device 220.

In some embodiments, a wireless communication device 302 may transmit signals that include an identifier within the geographic area 304. In some embodiments, geographic area 304 may include a lot, garage, space, and/or any other kind of property, such as one or more listing locations. In some examples, wireless communication device 302 is a broadcast device, such as a beacon or other type of hardware transmitter. In some examples, the bounds of the geographic area 304 may be defined by the signal range associated with wireless communication device 302. In some examples, the signal range is defined by the area in which the strength of the signal exceeds a threshold, such as −40 dBm. In some examples, wireless communication device 302 may correspond to one or more of computing devices 110, 140, 170, media device 210, and/or vehicle media device 220. In some examples, the identifier includes information about wireless communication device 302 and information that may be recognized by a first software application installed on wireless media device 306. In some examples, the identifier may be changed periodically, such as every second; identifiers may be changed for enhanced security. In some examples, the first software application actively monitors signals and compares identifiers included in those signals with those stored in a database. In some examples, signals are encoded or modulated according to predetermined parameters. In some examples, the database may include a cloud managed SQL database, such as a MICROSOFT AZURE database. In some examples, the first software application enables wireless devices to detect wireless communication devices such as beacons in proximity.

In some embodiments, geographic area 304 is a parking lot. In some examples, at the entrance to the parking lot there is a kiosk or other fixed device that uses a short-range wireless technology, such as near-field communication (NFC), BLUETOOTH low energy (BLE) and/or the like, which, when in proximity or direct contact with wireless media device 306, causes wireless media device 306 to prompt a pass to be added to the first software application. In some examples, the fixed device includes an NFC reader, RFID tag reader, a facial recognition device, retina scanner, a finger print reader, bar code scanner, and/or the like and/or combinations thereof.

In some embodiments, the pass may be added when an identifier associated with wireless communication device 302 is recognized. In some examples, the pass is mapped to a unique identifier of wireless communication device 302 and a coded image, and the pass is only added when the unique identifiers match. Requiring a matching of the two identifiers may function as a method of verification that wireless media device 306 is physically present in the geographic area 304.

In some embodiments, when an identifier is recognized, a corresponding message is prompted on the wireless media device 306. In some examples, the corresponding message is a notification, alert, update, text message, chime, and/or the like, on wireless media device 306. In some examples, the corresponding message presents a pass when a second software application, such as a parking application (e.g., PIED PARKER), is not installed on wireless media device 306. In some examples, the corresponding message is a notification from the second software application such as a parking application (e.g., PIED PARKER), installed on wireless media device 306. In some examples, the corresponding message includes a request to search for a listing location. In some examples, the corresponding message includes a link. In some examples, the link is a deep link, such as a uniform resource identifier (URI) that launches a resource within a second software application. A deep link enables wireless media device 306 to launch a second software application to a relevant portion within the second application without having to separately launch the second software application and navigate to that relevant portion. In some examples, the deep link is a deferred (AKA persistent) deep link, such that it routes wireless media device 306 to content even if the second software application is not installed when the link is activated; instead wireless media device 306 is redirected to an application store, such as GOOGLE PLAY or the APP STORE, to allow for download and/or installation of the linked-to application, and then, upon completion of the download and/or installation, launches the second software application and navigates to the relevant portion. Some advantages of disclosed embodiments include the ability of an operator of wireless media device 306 to have a pass prompted to be added to their phone, giving them the opportunity to wait until they park to download the second software application and/or transmit the search request. This allows for the operator to avoid having to complete the transaction while at the gate or while driving and looking for a parking space; the operator may simply wait until the operator is safely stopped to complete the transaction, which may result in reduced traffic, less accidents, simplification of user experience, and faster processing of transactions. In some examples, the operator of wireless media device 306 may cause the second software application to be downloaded and/or routed to content within the second software application using short-range wireless technology, such as NFC. In some examples, the wireless media device 306 in response to NFC contact, prepares a search request including payment information, the search request being completed with little to no input from the operator, such as requesting confirmation of payment from the operator.

In some embodiments, a second software application, such as PIED PARKER, may already be downloaded on wireless media device 306. In some examples, when the second software application is already downloaded, the second software application may generate one or more search request parameters automatically, and a search request may be generated. In some examples, only one software application is required. In some examples, search request parameters are associated with listing locations, parameters including, but not limited to, preset information or data concerning listing locations previously requested by wireless media device 306, a time of entering the search request, a proximity to the physical location of wireless media device 306, an availability time, temporal duration of reservation period, time remaining for availability, a type of listing location, such as whether the listing location can accommodate motorcycles, trucks, compact vehicles, and/or the like; a price range for a listing location, dimensions associated with listing locations, whether or not the listing location has an over-head cover, whether or not the listing location is an electric vehicle (EV) charging station, whether or not the listing location provides gas-filling services, a user rating associated with the listing location, such as a one to five star rating, a unique identifier associated with a parking space or parking lot, and/or the like and/or a combination thereof.

In some embodiments, wireless communication device 302 is a plurality of one or more devices, and the plurality of one or more devices and/or wireless media device 306 are part of a mesh network. In some examples, wireless media device 306 connects to one or more nodes of the mesh network, including one or more devices associated with geographic area 304. In some examples, the plurality of one or more devices may include, but are not limited to, a Wi-Fi modem, GPS, RFID, a BLUETOOTH component, which may include, smart devices, a vehicle or vehicle media device, such as vehicle media device 220; and/or the like; a hotspot tether, a 3G or 4G modem, an LTE modem, a parking sensor, such as object detection sensors discussed above with respect to FIG. 2, and/or the like and/or combinations thereof.

In some embodiments, geofencing may be used to determine when wireless media device 306 enters or leaves geographic area 304 by means of a predetermined virtual geographic boundary that includes geographic area 304. In some examples, geographic area 304 may be a home, office location, commercial parking lot, and/or the like. In some examples, geographic area 304 is non-circular, and may be rectangular, oval, square, triangular, trapezoidal, a polygon, and/or the like and/or any other shape. In some examples, geofencing may rely on machine learning to adjust the virtual boundary, such as using systems and methods disclosed in U.S. Pat. No. 9,349,104, which is incorporated by reference in its entirety. In some examples, the virtual boundary may be dynamically adjusted based on machine learning using data associated with the mesh network, data including listing location data, such as GPS coordinates, wireless media device location data, wireless media device location data and time, and telemetric data between wireless media device 306 and one or more beacons. In some examples, a message may be sent in response to determining wireless media device 306 has entered or left geographic area 304 based on location data associated with wireless media device 306.

In some embodiments, the mesh network is used to enable geofencing, creating a virtual geographic boundary including geographic area 304. Some advantages of disclosed embodiments include the ability of the operator of wireless media device 306 to delay completion of the transaction until returning to the geographic area 304. For instance, an operator may return to geographic area 304, and upon verification that operator has entered geographic area 304, a notification may be prompted that reminds the operator to complete the payment transaction before departing geographic area 304, such as in a parking lot with a gate arm that lifts upon verification of payment. Some advantages of disclosed embodiments include the increased accuracy of verifying when a wireless media device has entered or departed a geographic area, and in some examples this verification may require limited use to no use of GPS or outside data networks (e.g., networks other than the mesh network). More specifically, in some parking garages, access to data networks may be limited because parking garages are often underground or are surrounded by thick walls of concrete. In some examples, the physical presence of wireless media device 306 may be verified without the use of GPS or data networks.

I. Automatic Listing Functionality

Figure 4:
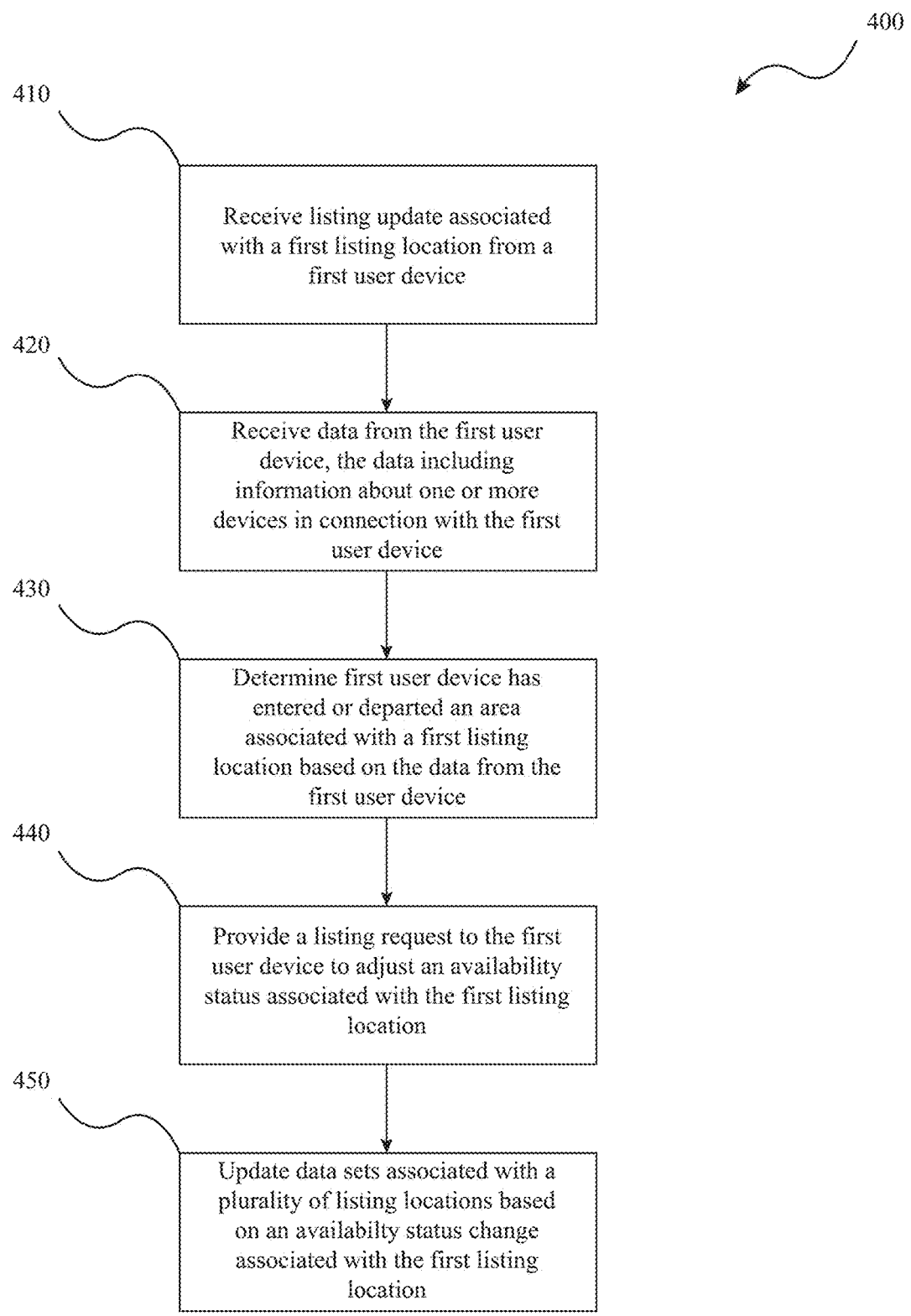
FIG. 4 is a flowchart illustrating an example method for determining a connection change and automatically adjusting an availability status associated with the first listing location using one or more media.

FIG. 4 is a flowchart illustrating an example method 400 for determining a connection change and automatically adjusting an availability status associated with the first listing location using one or more media devices. In some examples, the one or more media devices may correspond to one or more of computing devices 110, 140, 170, media device 210, vehicle media device 220, and/or wireless media device 306, and one or more sensors may include those sensors discussed above with respect to FIG. 2. Method 400 is illustrated in FIG. 4 as a set of processes 410-450. In some examples, processes 410-450 may be implemented on one or more application servers, such as application servers 230. In some examples, not all of the illustrated processes may be performed in all embodiments of method 400. Additionally, one or more processes not expressly illustrated in FIG. 4 may be included before, after, in between, or as part of processes 410-450. In some embodiments, one or more processes 410-450 may be implemented, at least in part, in the form of executable code stored on non-transitory, tangible, computer readable media that when run by one or more processors (e.g., a processor of the media device) may cause the one or more processors to perform one or more of processes 410-450.

During a process 410, a listing update associated with a first listing location may be received. In some examples, the listing update is sent from a first user device of the one or more media devices. In some examples, the listing update may include preset information or data concerning listings previously requested by the first user device, information associated with a listing location, which may include listing parameters such as a proximity to the physical location of a second location, such as a user device location or point-of-interest; an image or a video clip illustrating the listing location, dimensions of the listing location, an availability time, time remaining for availability, proximity of availability time to another reference time, a type of listing location, such as whether the listing location can accommodate motorcycles, trucks, compact vehicles, and/or the like; dimensions associated with listings, dimensions of vehicles associated with respective user devices, information about any hazards, whether or not the listing has a garage, instructions for unlocking a gate or garage, such as a passcode or pattern, information about price and time, such as price per hour, price for various times during a day, price per day, price per week/month/year, relative size of listings, a price range, whether or not the listing location has an over-head cover, such as a roof or carport, whether or not the listing location is an electric vehicle (EV) charging station, past, current, and/or future demand for the listing; a user rating associated with the listing location, such as a one to five star rating, and/or the like, and/or combinations thereof. In some examples, the listing location may include one or more parking spaces. The listing client device may be used by a user of a system, such as system 200, to list a parking space for rental or lease by other users of the system.

During a process 420, data may be received from the first user device by the one or more application servers, the data including information about one or more devices in connection with the first user device. In some examples, one or more devices in connection with the first user device may include, but are not limited to, a Wi-Fi modem, GPS, RFID, NFC, BLE, and/or a BLUETOOTH component, which may include, smart devices, a vehicle or vehicle media device, such as vehicle media device 220; and/or the like; a hotspot tether, a 3G or 4G modem, an LTE modem, a parking sensor, such as object detection sensors disclosed in U.S. Pat. No. 9,761,140 and/or the like and/or combinations thereof.

During a process 430, it may be determined that the first user device has entered or departed an area based on data collected from the first user device. In some examples, the area may be associated with a first listing location. In some examples, the area may not be associated with a first listing location, and the first user device may be heading in the direction of the first listing location. In some examples, it may be determined that the first user device has entered or departed an area based on one or more connection changes-a first connection change may be determined based on data from the first user device, the connection change being between the first user device and the one or more devices. In some examples, the connection change is determined by the one or more application servers, the first user device, and/or the like. In some examples, as a result of a change of one or more connections, the first user device may transmit data about the change of the one or more connections to the one or more application servers. In some examples, the connection change is determined based on a detection that one or more signals from the one or more devices are becoming weak below a predefined threshold, such as −40 dBm, or becoming undetectable by the first user device. In some examples, the first user device may be connected to a home Wi-Fi. As the first user device is no longer in close proximity with the home Wi-Fi, the home Wi-Fi signal may be too weak, and the connection would be lost. As the first user device is no longer in close proximity with one or more home devices via BLUETOOTH connections, the one or more signals may be too weak, and the connection would be lost. In some examples, a data connection could be transitioned on the first user device from Wi-Fi to a cellular network. In some examples, the connection change may include the first user device becoming connected with a network of a vehicle, including Wi-Fi or a BLUETOOTH component of a vehicle. In some examples, the connection change may be determined by the MAC address specific to one or more devices. In some examples, the BLUETOOTH component of the vehicle corresponds to a vehicle media device, such as vehicle media device 220, that activates upon activation of a battery of the vehicle. In some examples, the one or more application servers may ping a parking sensor associated with the first listing location and request the last proximity measurement from a sensor memory. The one or more application servers may also ping the parking sensor to activate a proximity detector of the parking sensor and query the parking sensor for a real-time proximity measurement.

In some embodiments, determining whether the first user device has entered or departed an area is based on a weighted sum of factors, with each of the factors being accorded a higher or lower weighted depending on whether the weighted sum is likely to indicate entrance/departure. In some examples, each of the factors is assigned a value, and when a sum of the factors exceeds a threshold, it is determined that a user-selectable message should be provided to the first user device. In some examples, the threshold may be a numeric range, such as 1-100, and the threshold may be 85. In some examples, factors may be weighted based on machine learning and artificial intelligence algorithms, such as algorithms discussed below with respect to FIG. 5. In some examples, factors include whether or not the first user device has a connection change with a Wi-Fi modem, GPS, RFID, NFC, BLE, and/or a BLUETOOTH component, and/or the like; information about a day of the week, information about location history associated with the first user device; sensor data, such as sensor data discussed below with respect to FIG. 5; traffic and weather information.

In some embodiments, geofencing may be used to determine when the first user device enters or leaves a particular area by creating a virtual geographic boundary around the particular area, such as geographic area 304.

During a process 440, the one or more application servers provide a listing request to the first user device to adjust an availability status associated with the first listing location. In some embodiments, a listing request is provided in response to a determination that the first user device has entered or departed an area by process 430. In some examples, the listing request is a notification, alert, text message, and/or the like, requesting the user of the first user device to change the availability status of the first listing location, and the listing request may include a link, recommended listing price, recommended time, information about an event, and/or the like. In some examples, the link launches an application, and prompts a user to edit an availability status associated with at least one listing location. In some examples, the link is a deep link, such as a uniform resource identifier (URI) that launches a resource within the application. A deep link enables a user to be able to launch a second application to a relevant portion within the second application without having to separately launch the second application and navigate to that relevant portion. In some examples, the deep link is a deferred (AKA persistent) deep link, such that it routes the user to content even if the second application is not installed when the link is activated; instead the user is redirected to an application store to allow for download and/or installation of the linked-to application, and then, upon completion of the download and/or installation, launches the second application and navigates to the relevant portion.

During a process 450, data sets associated with a plurality of listing locations may be updated. In some examples, data sets may be included in a database. In some examples, the database may store in one or more database tables positional data concerning a listing location. In some examples, the database may include a cloud managed SQL database, such as a MICROSOFT AZURE database. In some examples, the database may be stored in a memory of a computing cloud. In some examples, the data sets are updated by the one or more application servers. In some examples, the data sets are updated in response to an update regarding the first listing location availability sent by the first user device. In some examples, the data sets are updated automatically without requesting the first user device to adjust the availability status associated with the first listing location and are updated based on the determination of process 430 that a connection change occurred.

Some advantages of disclosed embodiments are increased availability of listing locations, faster processing of transactions, reduced traffic, and simplification of user interface. A user may leave his home for example to start a workday. The user could be expected to be gone for at least 8 or 9 hours, based on location data, for instance. As a result, a listing request is provided to the user, who might otherwise have forgotten to list the available parking space, or who might have remembered at a later time. The result may be an increased length of time for availability of the listing location associated with that user, faster processing of the listing availability, and simplified use of an associated smartphone application. Other drivers in the area may spend less time on the road, reducing congestion. In some examples, method 400 is a method for enabling a computer to automatically update listing locations-without requiring input from a user. The user may for instance, have settings enabled that automatically list the parking space as that user departs from his listing location. For example, a user may leave his or her house with their smartphone. This may include one or more connection changes such as disconnecting from the Wi-Fi and connecting to a BLUETOOTH component associated with a vehicle. The dual connection change may be enough indication that the user is leaving for a workday, which triggers an auto-listing of the listing location(s) associated with that user. Determining whether to auto-list based on other factors, such as location history associated with the smartphone, may eliminate false positives, such as the user leaving to go to a grocery story on a weeknight or a weekend.

Some advantages of disclosed embodiments further include increased availability of listing locations with reduced overlap of listing location reservation times. For instance, a user may be leaving work or another location and returning to a location associated with one or more user listing locations. The user will want to be able to park upon returning and may need a vehicle currently at the parking spot to depart. In some examples, as the user departs, respective statuses of one or more listing locations associated with the user are changed to being unavailable. Another user may be currently occupying the listing location associated with the first user and may be notified of the unavailability. The other user may also be provided with an incentive such as coupons or credits, in order to incentivize departure before arrival of the first user at the listing location.

Such intelligent parking systems increase efficiency with respect to parking, reduce traffic, reduce accidents, diminish or eliminate the need for vehicle operator (i.e., user) input, more accurately predict parking needs, and lead to faster processing of parking transactions. By shortening the time spent looking for parking for drivers, less cars will be on the road looking for parking, significantly decreasing traffic.

II. Vehicle Movement Detection

Figure 5:
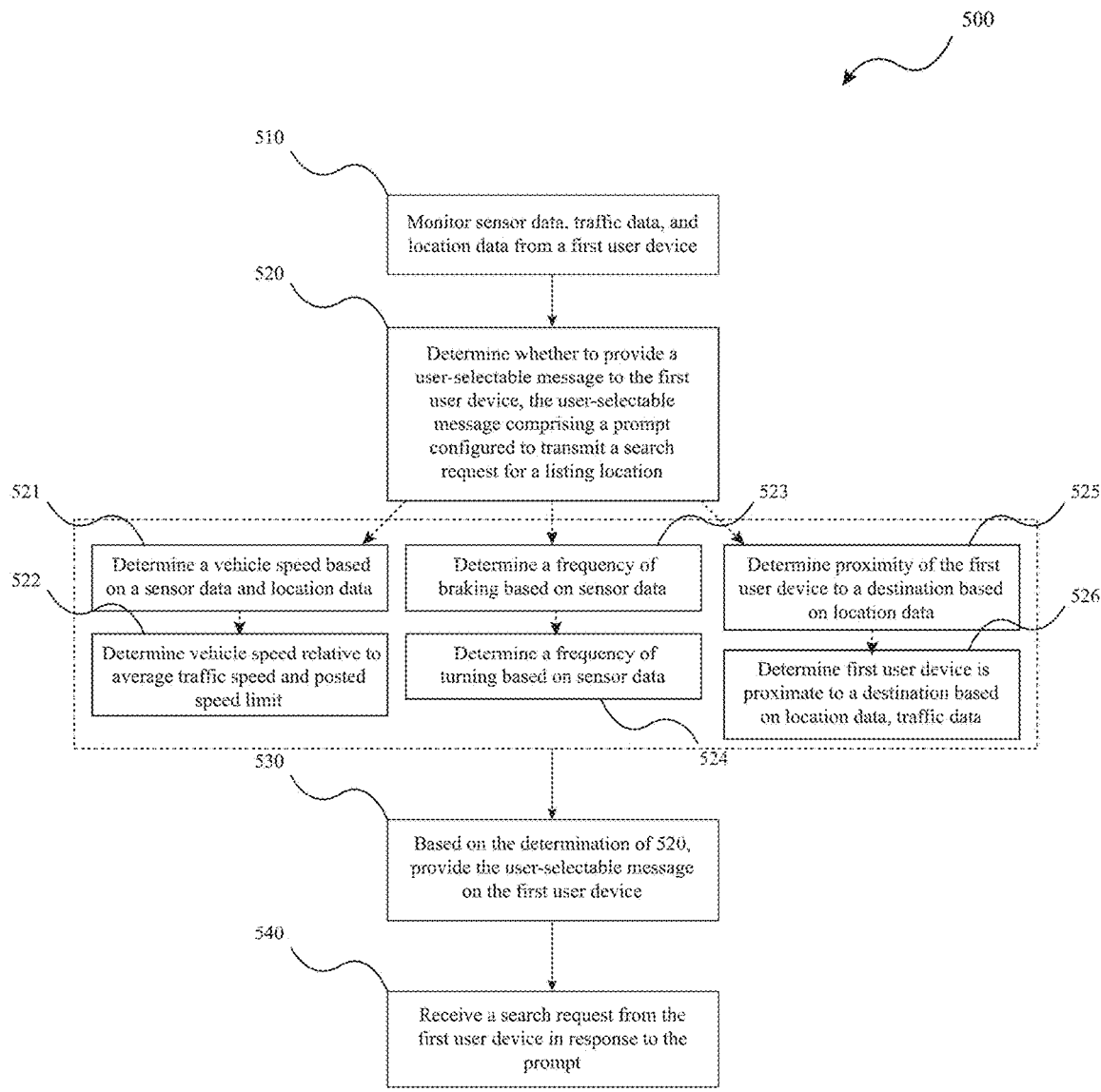
FIG. 5 is a flowchart illustrating an example method for providing a user-selectable message including a prompt configured to transmit a search request for a listing location using one or more media devices.

FIG. 5 is a flowchart illustrating an example method 500 for transmitting a user-selectable message to the first user device, the user-selectable message including a prompt configured to transmit a search request for a listing location based on data associated with the first user device. In some examples, the one or more media devices may correspond to one or more of computing devices 110, 140, 170, media device 210, vehicle media device 220, and/or wireless media device 306, and one or more sensors may include those sensors discussed above with respect to FIG. 2. Method 500 is illustrated in FIG. 5 as a set of processes 510-540. In some examples, processes 510-540 may be implemented on one or more application servers, such as application servers 230. In some examples, not all of the illustrated processes may be performed in all embodiments of method 500. Additionally, one or more processes not expressly illustrated in FIG. 5 may be included before, after, in between, or as part of processes 510-540. In some embodiments, one or more processes 510-540 may be implemented, at least in part, in the form of executable code stored on non-transitory, tangible, computer readable media that when run by one or more processors (e.g., a processor of the media device) may cause the one or more processors to perform one or more of processes 510-540. In some examples, processes of method 500 may be executed subsequent to one or more steps described in the method 400.

During a process 510, sensor data, traffic data, and location data may be monitored from a first user device of the one or more media devices. In some examples, monitoring may occur continuously, periodically, and/or at set location markers. In some examples, process 510 may be performed concurrently with other steps in method 500. In some examples, the sensor data may be forwarded from the first user device to one or more application servers. Sensor data may correspond to sensors, such as those discussed above with respect to FIG. 2, of the first user device, or sensors in connection with the first user device. In some examples, the first user device includes an accelerometer, inertial unit, gyroscope, magnetometer, and/or the like and/or a combination thereof. In some examples, the sensors in connection with the first user device are vehicle operation sensors, such as those described above with respect to FIG. 2. In some examples, the inertial unit may be implemented as a multi-axis accelerometer including a three-axis accelerometer, a multi-axis gyroscope including a three-axis microelectromechanical systems (MEMS) gyroscope, and/or the like and/or a combination thereof.

In some examples, traffic data may be received by one or more application servers, which may include a geolocation, mapping, and navigation application such as GOOGLE MAPS, APPLE MAPS, WAZE, and/or the like and/or combinations thereof. In some examples, traffic data may include information about roads, including current congestion and congestion trends on one or more roads, accidents, emergencies, construction, road closings, detours, truck stops, rest stops, weather conditions, other road conditions, and/or the like. In some examples, one or more geolocation, mapping, and navigation applications integrates the application programming interface (API) from a second server, the second server being coupled to a database of listing locations. In some examples, the second server, being coupled to a database of listing locations, hosts an API of a geolocation, mapping, and navigation application. Some advantages of integrated API include interoperability between applications and availability of other services through an application, creating a more seamless and convenient user experience with increased accessibility.

During a process 520, it may be determined whether to provide a user-selectable message to the first user device, the user-selectable message comprising a prompt configured to transmit a search request for a listing location. In some examples, the first user device may have an application actively running on the first user device that assists with parking a vehicle. In some examples, the determination may be based on the sensor data, traffic data, location data, and/or the like and/or combinations thereof.

In some embodiments, the determination may be made based on one or more factors. In some examples, the factors are associated with vehicular movement. In some examples, the factors include a vehicle speed, a vehicle speed relative to an average traffic speed and/or posted speed limit, frequency of braking, frequency of turning, proximity to a destination, and/or the like and/or combinations thereof. In some examples, each of the factors is assigned a value, and when a sum of the factors exceeds a threshold, it is determined that a user-selectable message should be provided to the first user device. The value may be equivalent to a weighted sum of each of the factors, with each of the factors being accorded a lower or higher weight depending on whether they are factors that are more likely to indicate that a vehicle operator and/or vehicle are searching for parking. In some examples, the threshold may be a numeric range, such as 1-100, and the threshold may be 85.

During a process 521, a vehicle speed may be determined based on sensor data and/or location data. In some examples, sensor data includes vehicle operation sensor data from one or more vehicle operation sensors, the vehicle operation sensor data including information about vehicle speed. In some examples, location data is tracked over time to calculate an average speed.

During a process 522, vehicle speed relative to average traffic speed and/or posted speed limit may be determined. An average traffic speed may be determined based on sensor data and/or traffic data. In some examples, sensor data may include data from the one or more vehicle operation sensors about distance from any nearby vehicles. In some examples, the posted speed limit may be determined based on the location data and reference to a database including posted speed limits along a first direction of travel. The first direction of travel may be made based on location and/or sensor data. Based on a comparison of vehicle speed to average traffic speed and/or posted speed limit, it may be determined that the vehicle speed is relatively low. In some examples, when a first user device's speed (corresponding to a vehicle speed) is relatively low compared to the average traffic speed and/or posted speed limit, for example, at 50% or less, it may be a strong factor indicating that a vehicle and/or vehicle operator is driving slowly to search for a parking space.

During a process 523, a frequency of braking may be determined based on sensor data and/or location data. In some examples, braking may be determined by vehicle operation sensors. In some examples, braking may be determined by rapid deceleration detected by an accelerometer of the first user device. In some examples, braking may be determined based on a rapid decrease in speed determined based on location data of the first user device over a time period. A rapid decrease may include a deceleration of more than 5 m/s$^2$ In some examples, a high rate of braking may be determined based on five or more braking occurrences within a one to two-minute period. In some examples, an application server may determine, with a low degree of certainty, based on a high rate of braking, that a vehicle and/or vehicle operator are stopping frequently to find a place to park.

During a process 524, a frequency of turning may be determined based on sensor data. In some examples, frequency of turning may be determined based on the sensor data and/or location data. In some examples, turning may be determined by vehicle operation sensors. In some examples, turning may be determined by an accelerometer of the first user device. In some examples, turning may be determined based on the location data over time compared to a first direction of travel of the first user device. In some examples, a high rate of turning may be determined based on two or three turns within a one to two-minute period. In some examples, a turn is a change in a direction of travel by more than 45 degrees. In some examples, an application server may determine, with a low degree of certainty, based a high rate of turning, that a vehicle and/or vehicle operator are circling streets to find a place to park.

During a process 525, a proximity of the first user device to a destination may be determined based on location data. In some examples, proximity to a destination may be based on location data and/or information from a geolocation, mapping, and navigation such as GOOGLE MAPS, APPLE MAPS, WAZE, and/or the like and/or combinations thereof. In some examples, a destination may include a previously stored location, such as a home or work place. In some examples, the destination may be stored based on input from a user or may be stored based on frequency of visit based on previous location data of the first user device.

Most geolocation, mapping, and navigation applications rely on the principles of grouping roads according to functions and capacities. In some examples, roads may be grouped in a hierarchy of descending order based on highest to lowest speed limit. In some examples, proximity to a destination may be determined based on the hierarchy of roads descending from higher order roads to lower order roads. In some examples, the hierarchy of roads may be used to diminish the weight of another factor used in process 520, such as the relative speed of the first user device compared to average traffic speed and/or posted speed limit. In some examples, when relative speed is low on a higher order road, such as a highway with posted speed limits of 55-70 MPH, it is unlikely that the vehicle and/or vehicle operator are looking for parking. Some advantages of disclosed embodiments include the elimination of false positives when a vehicle and/or vehicle operator are looking for parking.

During a process 526, it may be determined that a first user device is proximate to a destination based on location data and/or traffic data. In some examples, a first user device is proximate when the distance to a destination is less than a threshold number of miles, such as less than 0.25-5 miles. A destination may include the destination indicated by a geolocation, mapping, and navigation application.

In some embodiments, closeness of proximity may be sized based on a number of available listing locations within a geographic area. In some examples, the geographic area is defined by a causal point-of-interest (POI). A causal POI may be determined based on listing requests being above a first threshold and may be based on traffic data. In some embodiments, a causal POI is defined as a geographical location with a predefined proximity to location of an event being or to be held. In some examples, a sports bar may be considered a causal POI around 7 pm on a Friday night, because the sport bar will offer a live broadcast of a baseball event at 8 pm that same Friday night. A street intersection may be considered a causal POI between 8 am to 12 pm on a Sunday morning, because a farmer market is often held at the street intersection during that time frame. In some examples, the first threshold may be exceeded when the traffic data indicates heavy traffic in a region. The causal POI may be a location or venue causing a surge or sudden increase in demand for parking within a vicinity of the causal POI. In some examples, the causal POI may include a sports stadium, a concert hall, a nightclub, a movie theater, a museum, or a restaurant, farmer's market, a political gathering, or a parade route and/or the like and/or a combination thereof.

In some embodiments, the causal POI may be determined by calculating a centroid of a polygon created by the positional coordinates of listing requests or search requests for listing locations received within a preset time period. In some examples, three listing location requests may be received within a 60 second period and the centroid of a triangle having vertices at the three desired booking locations included in the three listing location requests may be calculated. In some examples, a causal POI may be determined when listing requests or search requests for listing locations within a certain region exceeds a first threshold, such as 5-10 listing and/or search requests per minute. The region may be established upon first receiving a first listing request or first search request. In some examples, if there are less than a threshold number of available spaces, such as 3-10 available spaces, within the causal POI, closeness of proximity may be expanded to a larger area, such as 0.25 miles or more. In some examples, a default closeness of proximity may be 1 mile. Some advantages of disclosed embodiments include more accurate predictions of areas of interest to vehicles and vehicle operators, and where those vehicles and/or vehicle operators are likely to be looking for parking.

In some embodiments, it may be determined whether to provide a user-selectable message to the first user device based on a weighted sum of factors exceeding a threshold value, with some factors being dispositive. In some examples, it may be determined that a user-selectable message should be sent to the first user device when the vehicle speed is relatively low compared to a traffic speed and a destination or POI is proximate. In some examples, it may be determined that a user-selectable message should be provided to the first user device when the vehicle speed is relatively low compared to a traffic speed, a frequency of braking is high, and a frequency of turning is high.

Some advantages of disclosed embodiments include providing a first user device with a prompt configured to transmit a search request for a listing location when a vehicle and/or vehicle operator is searching for parking, and a first user device is likely to respond with an affirmative request for a listing location. In some examples, a vehicle and/or vehicle operator is looking for street parking. The vehicle and/or vehicle operator may have a destination, but may need parking close to that destination. For several blocks, the vehicle and/or vehicle operator may circle blocks, driving further away from the destination in search of parking. In some examples, based on sensor data, traffic data, and/or location data, several factors may be weighed in determining whether to provide a user-selectable message on the first user device that includes an inquiry of whether the user would like to initiate a search for parking, such as using method 700, discussed below.

Some advantages of disclosed embodiments include the autogeneration of search requests for listing locations, with little to no input from a user. In some examples, a driver with a smartphone enters a parking garage and receives a notification prompting the driver to book and reserve a parking space; all of the information about the driver's preferences, such as preferences for compact vs. large parking spaces, EV charging stations, and temporal duration may be inputted into a search request automatically. In some examples, the search request may be sent once network data is available to the driver's smartphone, and the driver subsequently completes the reservation of the parking space before returning to the parking garage. In some examples, a confirmation identifier may be sent to the driver's smartphone as a receipt, which may be shown/scanned in order to enter or exit the garage.

In some embodiments, it may be determined whether to provide a user-selectable message to the first user device, the user-selectable message including a prompt configured to transmit a search request for a listing location based on the first user device being in a vicinity of one or more listing locations. In some examples, an application server coupled to a database of listing locations may receive location data from the first user device. In some examples, when the first user device is near a listing location, such as within 100-2,000 ft. of an available parking space, it is determined that a user-selectable message should be provided to the first user device.

In some embodiments, factors may be weighted based on machine learning and artificial intelligence algorithms. In some examples, machine learning algorithms that may be used include regression, such as logistic regression and linear regression, Decision Tree, Random Forest, K Nearest Neighbors (KNN), gradient boosting, such as gradient boosting machine (GBM), extreme gradient boosting (XGBoost), LightGBM, and CatBoost; Apriori, K-means, Naive Bayes, support vector machine (SVM) and/or the like and/or combinations thereof. Based on data collected from various user devices, including sensor data of vehicles and/or user device, profiles may be created for discrete driver behavior, including styles such as a normal/safe driving style, aggressive driving style, inattentive driving style, drunk driving style, drowsiness style, and/or the like; according to systems and methods disclosed in "A Review of Intelligent Driving Style Analysis Systems and Related Artificial Intelligence Algorithms," by Gys Albertis et al. which is incorporated by reference in its entirety. Meiring, G. A. M., & Myburgh, H. C. (2015). "A review of intelligent driving style analysis systems and related artificial intelligence algorithms." Sensors, 15(12), 30653-30682. In some examples, historical data may indicate whether a driver is prone to frequent braking, swerving, slow driving compared to traffic speed, and/or the like. In some examples, it may be determined based on the historical data that one or more users associated with the first user device has history similar to one or more profiles. In some examples, factors may be weighted differently based on the profile and/or historical data.

During a process 530, a user-selectable message to the first user device may be provided in response to the determination of process 520, the user-selectable message comprising a prompt configured to transmit a search request for a listing location. In some examples, the user-selectable message is a notification, alert, update, text message, chime, and/or the like, requesting the user of the first user device to search for a listing location, and the listing location may include a link, a recommended time to search, information about an event, information about a price, and/or the like and/or combinations thereof. In some examples, the link launches an application, and prompts a user to edit an availability status associated with at least one listing location. In some examples, the link is a deep link, such as a uniform resource identifier (URI) that launches a resource within the application.

During a process 540, a search request is received from the first user device in response to the message. A search request may include search request parameters associated with listing locations, including, preset information or data concerning listings previously requested by the first user device, listing parameters such as a proximity to the physical location of a second location, such as a user location or point-of-interest; an image or a video clip illustrating the listing location, dimensions of the listing location, an availability time, time remaining for availability, proximity of availability time to another reference time, a type of listing location, such as whether the listing location can accommodate motorcycles, trucks, compact vehicles, and/or the like; dimensions associated with listings, dimensions of vehicles associated with respective user devices, information about any hazards, whether or not the listing has a garage, instructions for unlocking a gate or garage, such as a passcode or pattern, information about price and time, such as price per hour, price for various times during a day, price per day, price per week/month/year, relative size of listings, a price range, whether or not the listing location has an over-head cover, such as a roof or carport, whether or not the listing location is an electric vehicle (EV) charging station, past, current, and/or future demand for the listing; a user rating associated with the listing location, such as a one to five star rating, and/or the like, and/or combinations thereof. In some examples, the type of listing location may be related to the type of parking space that accommodates certain vehicles, including sedans, trucks, SUVs, motorcycles, scooters, self-balancing scooters (e.g., SEGWAY), hoverboards, drones, buses, golf carts, trains, trolleys, amusement vehicles, recreational vehicles, bicycles, boats, watercrafts, helicopters, airplanes, and/or the like. In some examples, a search request may be provided in response to an input to a listing location on a graphical user interface (GUI) of the first user device. In some examples, a search request may be transmitted by the first device automatically without input from the first user device. In some examples, once the search request is received, a first listing location is selected in a manner similar to process 720.

Some advantages of disclosed embodiments include faster processing of transactions, reduced traffic, reduced accidents, and simplification of user experience. In some examples, method 500 is a method for enabling a computer to automatically search for a listing location-without requiring input from a user. In some examples, a vehicle operator is searching for street parking or commercial parking, whatever is first available. In many cities across the world, it is illegal to operate a smartphone while driving. Moreover, it may be difficult or impossible to pull over and operate a smartphone to look for parking using the smartphone. Using an application on the vehicle operator's smartphone, the vehicle operator could simply have the smart device interact with the vehicle and application servers to detect that the user is likely looking for parking, sending a request for a parking space without requiring the input from the user. In some examples, the application may be running in the background of the smartphone, monitoring sensor data, traffic data, and location data. The smart device may provide a notification to the user, enabling the user to search for a parking spot by audio confirmation, a single click, or single tap on a touchscreen. This simplifies the user experience and enables the user to find parking faster, legally, and more safely, and has the added benefit of reducing congestion on the road.

Figure 6:
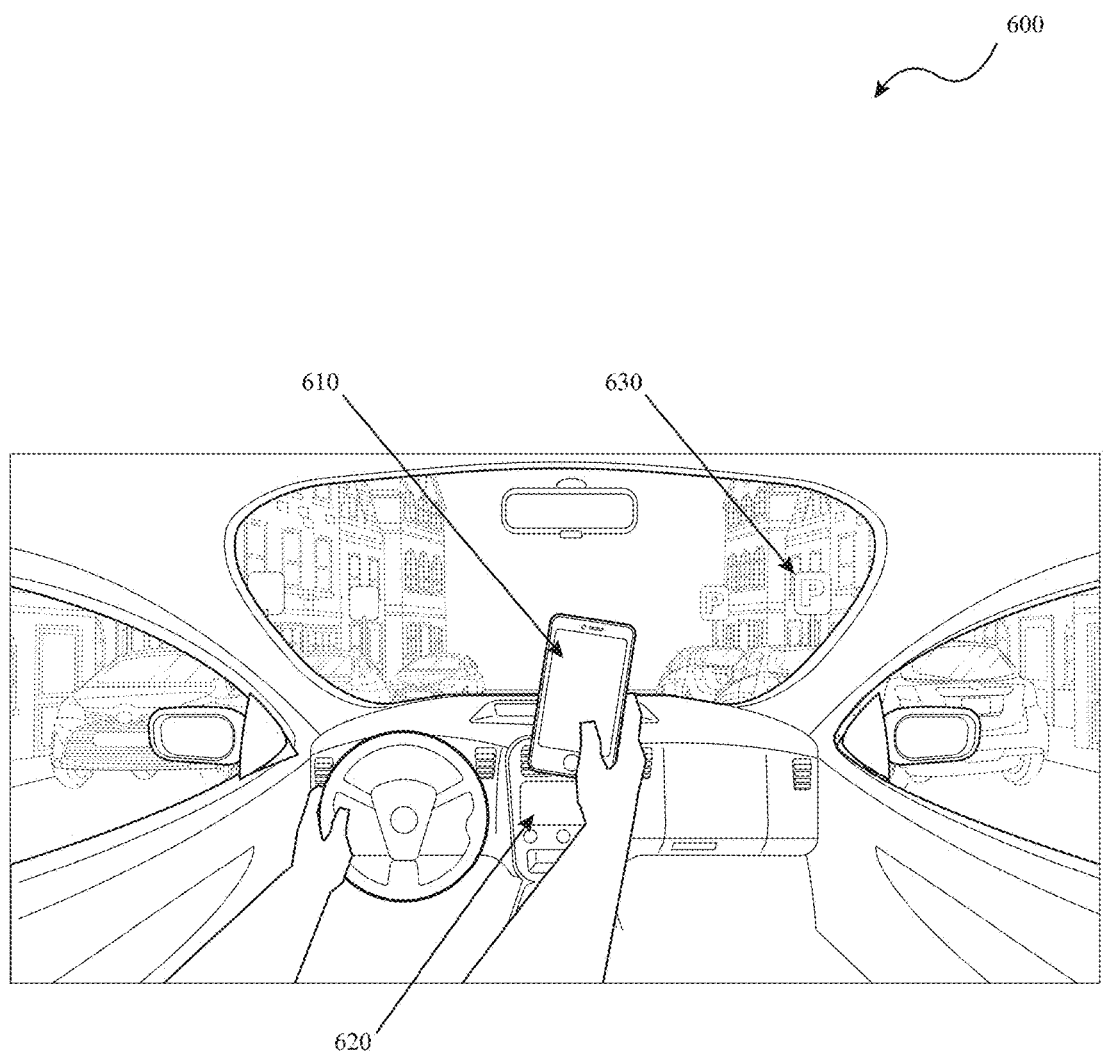
FIG. 6 is an example diagram of a vehicle with one or more devices looking for a parking space.

FIG. 6 is an example diagram of a system 600 with one or more wireless devices looking for a parking space. In some embodiments, system 600 includes wireless device 610 and on-board vehicle device 620. In some examples, wireless device 610 corresponds to one or more of computing devices 110, 140, 170, media device 210, sensors discussed above with respect to FIG. 2 and/or wireless media device 306. In some examples, on-board vehicle device 620 corresponds to one or more of computing devices 110, 140, 170, and/or vehicle media device 220.

In some embodiments, a user operating a vehicle with wireless device 610 and on-board vehicle device 620 is looking for parking. In some examples, wireless device 610 is mounted to the vehicle. In some examples, sensor, location, and traffic data may be monitored on one or more of wireless device 610 and on-board vehicle device 620. A user-selectable message may be provided on wireless device 610 and/or on-board vehicle device 620 based on factors discussed above with respect to FIG. 5. One or more parking spaces may be displayed on wireless device 610, on-board vehicle device 620, and/or through an augmented reality (AR) windshield, such as the AR windshield described in U.S. patent application Publication Ser. No. 14/774,564 ('564 application), which is hereby incorporated by reference in its entirety. Media projected using the augmented reality windshield would not be limited to the images and outputs disclosed in the '564 application.

In some embodiments, the parking space 630 is presented to the vehicle operator, and a prompt configured to transmit a search request (as discussed above with respect to FIG. 5) for the parking space is provided. In some examples, the search request is transmitted and directions to the parking space are received.

Some advantages of disclosed embodiments include faster processing of parking transactions, reduced traffic, reduced accidents, and simplification of user experience. In some examples, a vehicle and/or vehicle operator is looking for street parking. The vehicle and/or vehicle operator may be busy with focusing on navigating and avoiding street traffic and may not be able to simultaneously look around for nearby parking. In some examples, based on sensor data, traffic data, and/or location data, several factors may be weighed in determining whether to provide a user-selectable message on the first user device that includes an inquiry of whether the vehicle and/or vehicle operator would like to initiate a search for parking, such as using method 700, discussed below. In response to a search request initiated by the vehicle and/or vehicle operator, one or more available parking spaces may be shown as in FIG. 6. In some examples, parking space 630 is secured for the vehicle without requiring user input on the wireless device 610 or on-board vehicle device 620. The vehicle and/or vehicle operator is able to focus on driving and watching the road instead of being distracted with looking for parking spaces, and the vehicle is able to get to a parking space more quickly and safely.

III. Automated Redirection to a Listing Location

Figure 7:
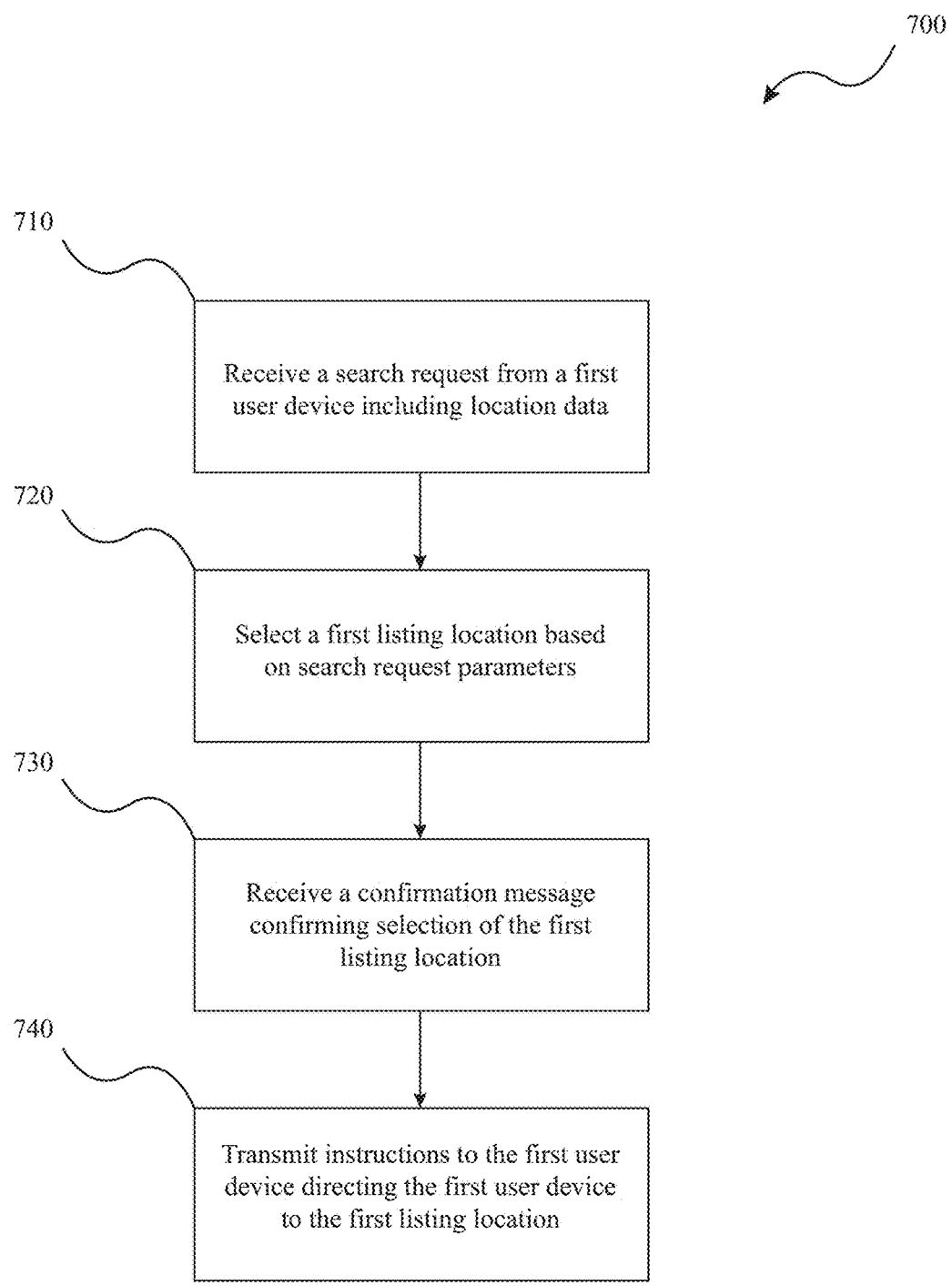
FIG. 7 is a flowchart illustrating an example method for searching for a listing location and transmitting instructions directing one or more wireless devices to a first listing location.

FIG. 7 is a flowchart illustrating an example method 700 for searching for a listing location and transmitting instructions directing one or more media devices to a first listing location. In some examples, the one or more media devices may correspond to one or more of computing devices 110, 140, 170, media device 210, vehicle media device 220, and/or wireless media device 306, and one or more sensors may include those sensors discussed above with respect to FIG. 2. Method 700 is illustrated in FIG. 7 as a set of processes 710-740. In some examples, processes 710-740 may be implemented on one or more application servers, such as application servers 230. In some examples, not all of the illustrated processes may be performed in all embodiments of method 700. Additionally, one or more processes not expressly illustrated in FIG. 7 may be included before, after, in between, or as part of processes 710-740. In some embodiments, one or more processes 710-740 may be implemented, at least in part, in the form of executable code stored on non-transitory, tangible, computer readable media that when run by one or more processors (e.g., a processor of the media device) may cause the one or more processors to perform one or more of processes 710-740. In some examples, processes of method 700 may be executed subsequent to one or more steps described in the method 400 and/or method 300.

During a process 710, a search request from a first user device may be received. In some examples, process 710 corresponds with process 540. In some examples, method 700 may proceed in succession of method 500. In some examples, before process 710, a map of listing locations may be displayed on a GUI of the first user device. An example GUI including listing locations is discussed with respect to FIG. 10. The map of listing locations may be filtered based on preset information or data concerning listings previously requested by the first user device, listing parameters such as a proximity to the physical location of a second location, such as a user device location or point-of-interest; whether there is an image or a video clip illustrating the listing location, an availability time, time remaining for availability, proximity of availability time to another reference time, a type of listing location, such as whether the listing location can accommodate motorcycles, trucks, compact vehicles, and/or the like; dimensions associated with listings, dimensions of vehicles associated with respective user devices, information about any hazards, whether or not the listing has a garage, instructions for unlocking a gate or garage, such as a passcode or pattern, information about price and time, such as price per hour, price for various times during a day, price per day, price per week/month/year, relative size of listings, a price range, whether or not the listing location has an over-head cover, such as a roof or carport, whether or not the listing location is an electric vehicle (EV) charging station, past, current, and/or future demand for the listing; a user rating associated with the listing location, such as a one to five star rating, and/or the like, and/or combinations thereof. In some examples, the search request may also include location data provided by the first user device, such as GPS coordinates and/or an address. In some examples, a search request may be sent by the first user device in response to activation of an augmented reality (AR) system, which is elaborated on further in discussion of FIG. 9. In some examples, a search request is sent on a first user device in response to input, that may include touch, hand movement, voice activation, and/or the like.

During a process 720, a first listing location is selected based on the search request parameters. In some examples, following selection of the first listing selection, the first user device is sent a confirmation query. In some examples, the first listing location is selected based on listing locations that match the search request parameters, including preset information or data concerning listings previously requested by the first user device, information associated with a listing location, which may include listing parameters such as a proximity to the physical location of a second location, such as a user device location or point-of-interest; dimensions of the listing location, an availability time, time remaining for availability, proximity of availability time to another reference time, a type of listing location, such as whether the listing location can accommodate motorcycles, trucks, compact vehicles, and/or the like; dimensions associated with listings, dimensions of vehicles associated with the first user device, information about any hazards, whether or not the listing has a garage, instructions for unlocking a gate or garage, such as a passcode or pattern, information about price and time, such as price per hour, price for various times during a day, price per day, price per week/month/year, relative size of listings, a price range, whether or not the listing location has an over-head cover, such as a roof or carport, whether or not the listing location is an electric vehicle (EV) charging station, past, current, and/or future demand for the listing; a user rating associated with the listing location, such as a one to five star rating, and/or the like, and/or combinations thereof. In some examples, a first listing location is selected and confirmed without further response from the first user device.

During a process 730, a confirmation message may be received, the confirmation message confirming selection of the first listing location. In some examples, booking of the first listing selection is confirmed following receipt of the confirmation message from the first user device. In some examples, data sets associated with a plurality of listing locations may be updated in a manner similar to process 450.

During a process 740, instructions may be transmitted to the first user device, the instructions directing the first user device to the first listing location. In some examples, the first user device is sent a message containing a link, the link launching a navigation application, entering the destination address or coordinates in the navigation application. In some examples, the link is a deep link, such as a uniform resource identifier (URI) that launches a resource within the navigation application. In some examples, the first user device is redirected from one destination within the navigation application to the first listing location.

Some advantages of disclosed embodiments further include providing temporary parking for vehicles being operated for ride sharing applications. In some examples, a vehicle operator is a driver for UBER, LYFT, SIDECAR, and/or another ride sharing application, and it may be difficult or illegal for a vehicle to pull over temporarily. An API of a parking application may be integrated within a ride sharing application. In some examples, before or during a scheduling of a ride, or at the end of a ride, a vehicle operator may search for a parking space using the ride sharing application with the integrated API. A search request is sent to an application server coupled to a database of listing locations. The listing locations may include parking spaces for temporary rental. The vehicle operator may select and confirm a suitable parking space for the ride, based on search parameters, such as parking space size. Upon confirming a selection, the ride sharing application may reroute the driver and direct the driver to the selected parking space.

IV. Vehicle Departure Detection System

Figure 8:
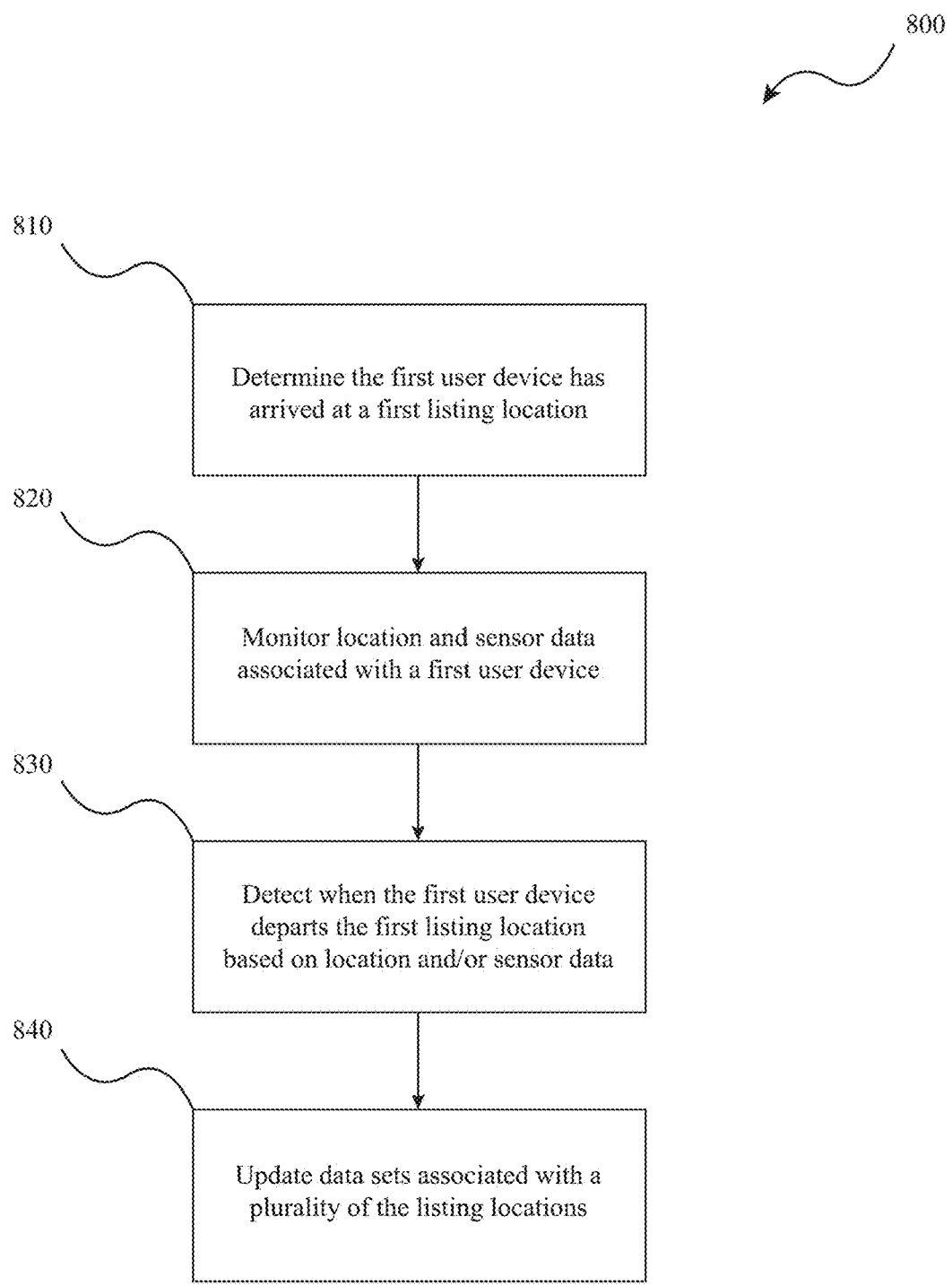
FIG. 8 is a flowchart illustrating an example method for automatically detecting whether a vehicle previously parked at a listing location has departed the first listing location and whether an occupancy status associated with the first listing locations should be updated.

FIG. 8 is a flowchart illustrating an example method 800 for automatically detecting whether a vehicle previously parked at a listing location has departed the first listing location, and whether an occupancy status associated with the first listing location should be updated, based on location and/or sensor data using one or more media devices. In some examples, the one or more media devices may correspond to one or more of computing devices 110, 140, 170, media device 210, vehicle media device 220, and/or wireless media device 306, and one or more sensors may include those sensors discussed above with respect to FIG. 2. Method 800 is illustrated in FIG. 8 as a set of processes 810-840. In some examples, processes 810-840 may be implemented on one or more application servers, such as application servers 230. In some examples, not all of the illustrated processes may be performed in all embodiments of method 800. Additionally, one or more processes not expressly illustrated in FIG. 8 may be included before, after, in between, or as part of processes 810-840. In some embodiments, one or more processes 810-840 may be implemented, at least in part, in the form of executable code stored on non-transitory, tangible, computer readable media that when run by one or more processors (e.g., a processor of the media device) may cause the one or more processors to perform one or more of processes 810-840. In some examples, processes of method 800 may be executed subsequent to one or more steps described in method 400, method 500, and/or method 700.

During a process 810, it may be determined that the first user device has arrived at a first listing location. In some examples, the first user device transmits a message including a notification, alert, update, text message, chime, and/or the like, once the first user device has arrived at the first listing location. The message may be user-selectable. In some examples, the message may be sent by a navigation application upon arriving at a destination. In some examples, the location data of the first user device may be monitored, and once the first user device location is within 10 meters of the listing location, it is determined that the first user device has arrived. In some examples, it may be determined that the first user device has arrived when one or more object detection sensors, such as object detection sensors discussed above with respect to FIG. 3, detect an object. In some examples, the one or more application servers may ping a parking sensor associated with the first listing location and request the last proximity measurement from a sensor memory. The one or more application servers may also ping the parking sensor to activate a proximity detector of the parking sensor and query the parking sensor for a real-time proximity measurement. In some examples, it may be determined that the first user device has arrived based on an input on the first user device.

During a process 820, location data and sensor data associated with a first user device are monitored. In some examples, monitoring may occur continuously, periodically, and/or at set location markers, including upon arrival at the first listing location. In some examples, process 820 may be performed concurrently with other steps in method 800.

During a process 830, departure of the first user device from the first listing location may be based on location data and sensor data. In some examples, the determination may be based on location data of the first user device being further than 10 meters from the first listing location. In some examples, the sensor data may include sensors of the first user device, or from sensors in connection with the first user device. In some examples, the first user device includes an accelerometer, an inertial unit, a gyroscope, a magnetometer, and/or the like. In some examples, the sensors in connection with the first user device are vehicle operation sensors, such as those described above with respect to FIG. 2. In some examples, it may be determined that the first user device departs based on detecting a sudden acceleration of the first user device, using the sensor data. In some examples, the determination may be based on a speed of the first user device being greater than a threshold, such as 3-10 meters per second based on the location data and/or sensor data. In some examples, the one or more application servers may ping a parking sensor associated with the first listing location and request the last proximity measurement from a sensor memory. The one or more application servers may also ping the parking sensor to activate a proximity detector of the parking sensor and query the parking sensor for a real-time proximity measurement.

In some embodiments, it may be determined that the first user device has not departed from the listing location. In some examples, when the first user device detects a sudden acceleration or is exceeding a threshold acceleration, within a threshold time, such as 5-15 minutes, it is not determined that the first user device has departed with the vehicle because it is likely that the first user device simply entered a second vehicle.

In some embodiments, geofencing may be used to determine when the first user device is departing in a manner similar to process 430.

In some embodiments, departure of the first user device that indicates that a first listing location is available includes detecting a signal between the first user device and a network associated with a vehicle, such as a BLUETOOTH connection.

In some embodiments, departure of the first user device is determined based on an input from the user device. In some examples, a notification, alert, update, text message, chime, and/or the like is transmitted to the first user device in order to confirm departure.

During a process 840, data sets associated with a plurality of listing locations are updated. In some examples, the data sets associated with the plurality of listing locations may be updated in a manner similar to process 450.

Some advantages of disclosed embodiments include faster processing, reduced traffic, reduced accidents, and simplification of user experience. In some examples, method 800 is a method for enabling a computer to detect when a listing location is available-without requiring input from a user or a separate parking sensor. In some examples, a vehicle operator arrives at a parking location and has an application running on the smart device. Within five minutes, the vehicle operator may walk away, or use a ride sharing application to get a ride. In such case, the application, tracking sensor data and location data, would not determine that the vehicle operator has departed the parking location with the vehicle in which the vehicle operator arrived. At some later time, the vehicle operator may return to the parking space. The application may continue tracking the sensor data and location data and may determine that the vehicle operator has returned to the parking location. Upon detecting a sudden acceleration and/or velocity exceeding a threshold, the application on the smart device could notify application servers that the smart device and vehicle are departing the parking location. The smart device may be sent a confirmation message to confirm departure from the parking space. It is often that a vehicle operator may forget to manually indicate departure, and so this feature has the added benefit of saving the vehicle operator the hassle of remembering, and saving the user added parking costs. The application may require payment upon confirmation of selection of a parking location or upon arrival, until departure. In absence of an automatic detection of departure, a vehicle operator may be charged for additional time, even after departing, because of forgetting to indicate departure in the application. Additional advantages may also include expedited processing of parking availability, which further reduces congestion on the road.

V. Augmented Reality Selection System

Figure 9:
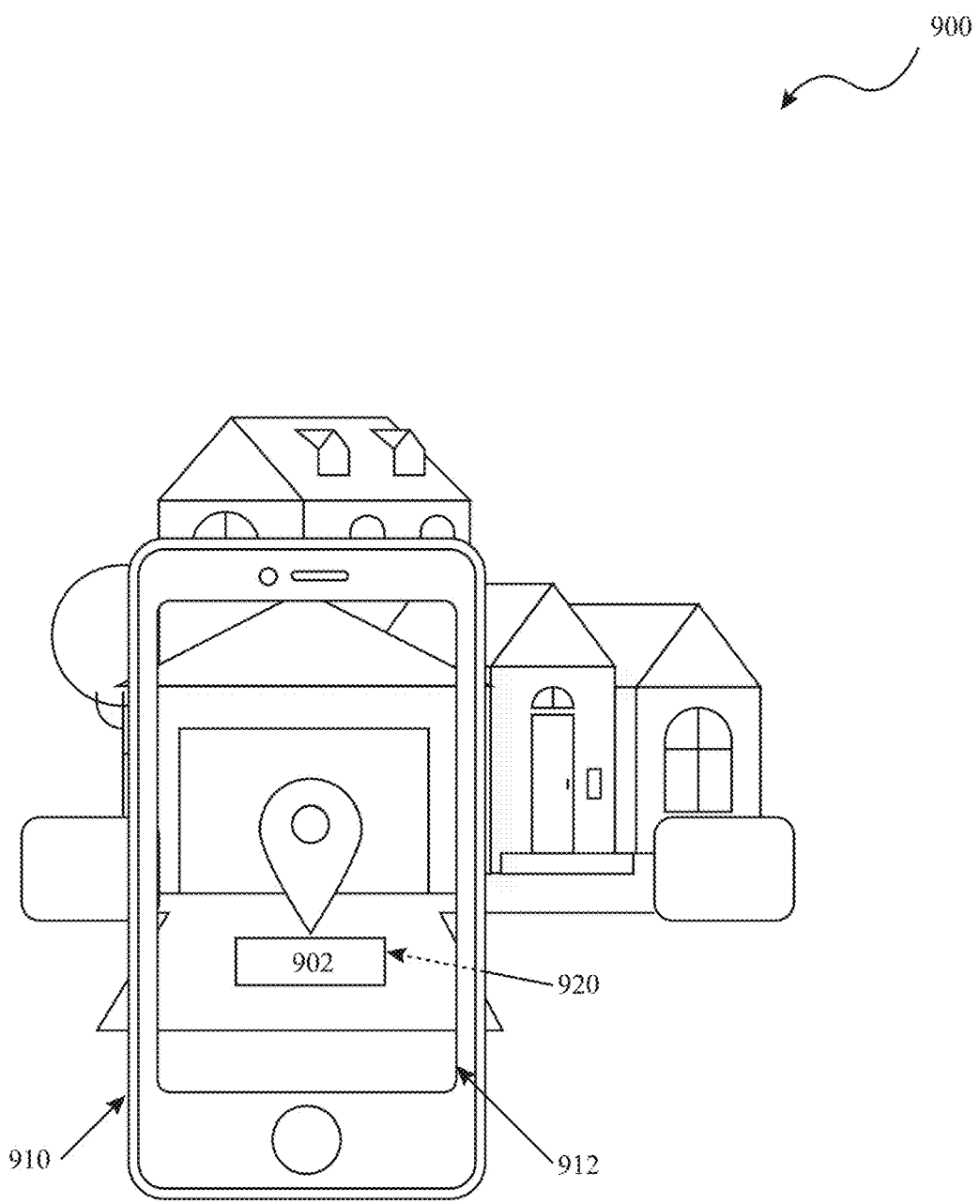
FIG. 9 is an example diagram of an augmented reality system.

FIG. 9 is an example augmented reality system 900, including media device 910 equipped with an augmented reality application. In some examples, media device 910 may correspond to one or more of computing devices 110, 140, 170, media device 210, vehicle media device 220, and/or wireless media device 306, and may include one or more sensors, such as sensors discussed above with respect to FIG. 2. In some examples, media device 910 is equipped with a location unit and a camera. The camera captures a real-time view in a first direction of media device 910 displays the real-time view on a media device display of media device 910, display 912, using a camera application. The location unit is used to determine a location of media device 910, and the locational information is sent to a second application server. In some examples, the second application server is coupled to a database of listing locations. In some examples, media device 910 begins capturing images on a camera in a first direction and displays the images on display 912. An API of the second application may be integrated within the camera application and display 912 displays a GUI of the camera view in a first direction of the camera overlaid with tags, images, videos, or other GUI objects in location areas corresponding to listing locations. In some examples, one listing location of the listing locations corresponds to first listing location 920. First listing location 920 is displayed on the display 912 as GUI object 902. In some examples, listing locations displayed may be filtered according to preset information or data concerning listings previously requested by the first user device, information associated with a listing location, which may include listing parameters such as a proximity to the physical location of a second location, such as a user device location or point-of-interest; whether there is an image or a video clip illustrating the listing location, dimensions of the listing location, an availability time, time remaining for availability, proximity of availability time to another reference time, a type of listing location, such as whether the listing location can accommodate motorcycles, trucks, compact vehicles, and/or the like; dimensions associated with listings, dimensions of vehicles associated with the first user device, information about any hazards, whether or not the listing has a garage, instructions for unlocking a gate or garage, such as a passcode or pattern, information about price and time, such as price per hour, price for various times during a day, price per day, price per week/month/year, relative size of listings, a price range, whether or not the listing location has an over-head cover, such as a roof or carport, whether or not the listing location is an electric vehicle (EV) charging station, past, current, and/or future demand for the listing; a user rating associated with the listing location, such as a one to five star rating, and/or the like, and/or combinations thereof.

In some embodiments, a listing location may be selected by a first user device using media device 910. In some examples, by fixing a camera in a direction of first listing location 920, media device 910 may detect that GUI object 902 is in frame on display 912 for a threshold time, such as 1-10 seconds. In some examples, detecting that GUI object 902 is in frame requires centering the GUI object 902 in the center of display 912 for 1-10 seconds. In response to detecting GUI object 902 being in frame on display 912 for the threshold time, first listing location 920 may be selected by media device 910, and the selection may be transmitted by media device 910 to the application server. In some examples, in response to the selection, data sets associated with a plurality of listing locations may be updated in a manner similar to process 450. In some examples, the selection may launch a second GUI object that includes details about first listing location 920, including a distance from first listing location 920 from media device 910, an availability time of first listing location 920, the type of listing location associated with first listing location 920, a price associated with first listing location 920, dimensions associated with first listing location 920, an occupancy status of first listing location 920, an outline of a listing location area, whether or not first listing location 920 has an over-head cover, whether or not first listing location 920 is an electric vehicle (EV) charging station, a user rating associated with first listing location 920, such as a one to five star rating, and/or the like and/or a combination thereof. In some examples, instead of a tag displayed on display 912, a 3-D image of a vehicle may be displayed. The 3-D image may correspond to the vehicle that may be in occupation or in future occupation of first listing location 920. In some examples, the 3-D image may be retrieved from a separate database of 3-D images corresponding to various types of vehicles, including sedans, trucks, SUVs, motorcycles, scooters, self-balancing scooters (e.g., SEGWAY), hoverboards, drones, buses, golf carts, trains, trolleys, amusement vehicles, recreational vehicles, bicycles, boats, watercrafts, helicopters, airplanes, and/or the like, and/or various vehicle makes and models.

In some embodiments, and location data and sensor data of media device 910 may be monitored. In some examples, monitoring may occur continuously, periodically, and/or at set location markers. In some examples, when the augmented reality system 900 is activated, it may be determined based on the location and/or data that media device 910 is travelling faster than a threshold speed, such as 3-10 m/s, possibly corresponding with a moving vehicle. In some examples, based on the determination that media device 910 is travelling faster than the threshold speed, media device 910 may disable functionality of the camera of media device 910 as a safety feature. Display 912 may display a notification or alert that may be bypassed by receiving an input. In some examples, the input may indicate that a user of media device 910 is a passenger of a vehicle.

In some embodiments, an application that provides panoramic views from positions along geographic points, such as GOOGLE MAPS, GOOGLE EARTH, and/or the like, is integrated with the API of a second application that is coupled to a database of listing locations, and vice versa.

The panoramic views may be overlaid with tags, images, videos, or other GUI objects in location areas corresponding to listing locations.

Some advantages of disclosed embodiments include enabling a user to view in 360 degrees available nearby listing locations. A user can simply aim and hold a user device in the direction of a listing location using the display with a GUI object corresponding to the listing location in order to select a listing location. The listing location may populate with further details, and request confirmation of selection. The user device then can book a parking space for the user and then launch a separate application, such as GOOGLE MAPS, to obtain directions to the parking space.

In some embodiments, the application server coupled to a database of listing locations may include a referral system, whereby a first user device with an application installed may refer a second user device to download the application using a unique referral code. In some examples, the second user device may be used to register one or more listing locations. In some examples, the first user device may earn a share of revenue earned by the second user device for rentals of the one or more listing locations, such as 5%-10%. In some examples, parking spaces that are not listed may be photographed using the AR system and the photographs may be sent to the application server. The application server may include a database of possible listing location candidates based on the photographs.

Figure 10:
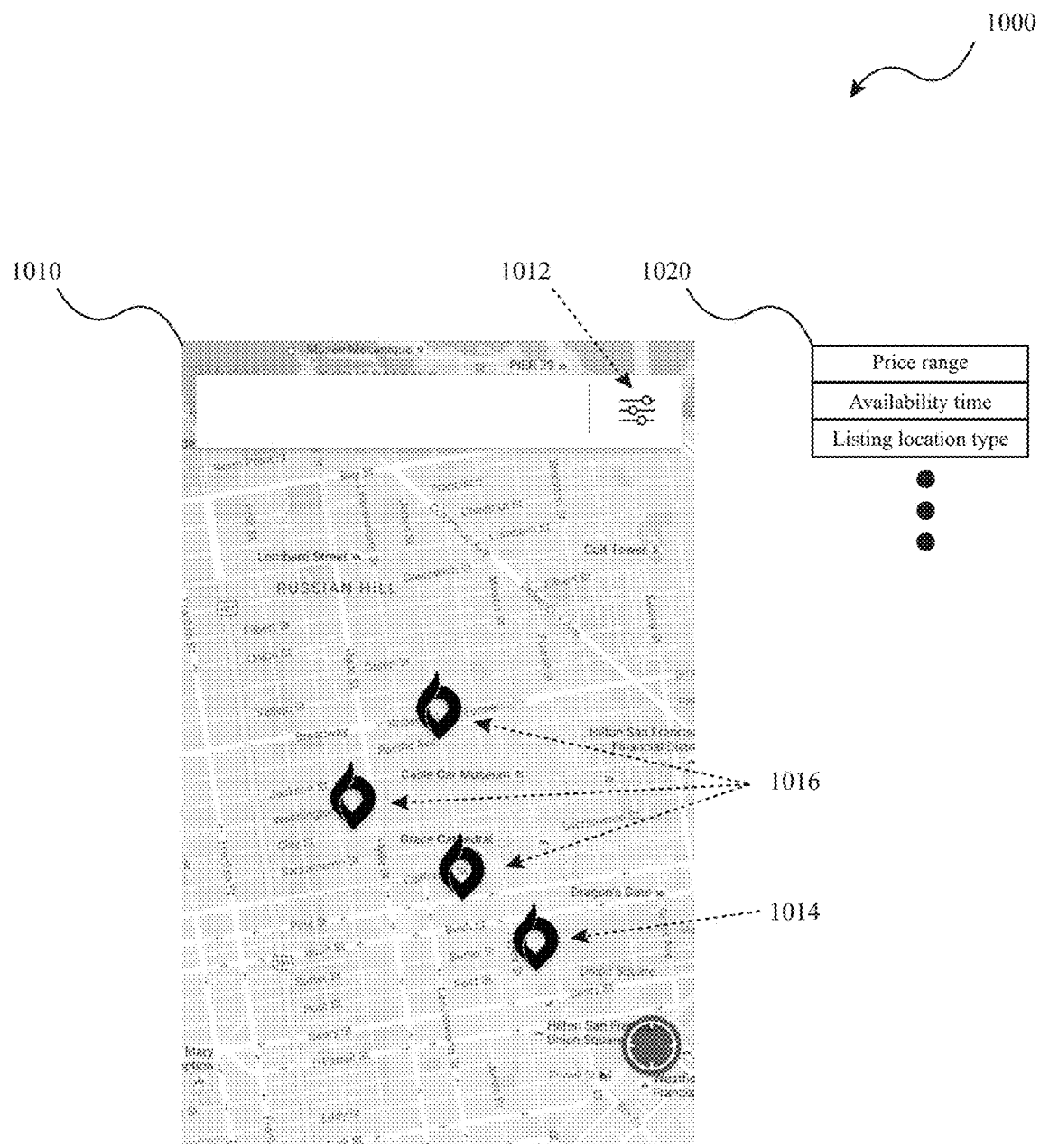
FIG. 10 is an example system for presenting one or more listing locations on a map displayed on a media device.

FIG. 10 is an example system 1000 for presenting one or more listing locations on a map displayed on a media device, which may correspond to one or more of computing devices 110, 140, 170, media device 210, vehicle media device 220, wireless media device 306, and/or media device 910. In some examples, the media device may include one or more sensors, such as those sensors discussed above with respect to FIG. 2. In some examples, GUI 1010 includes a map with a plurality of GUI objects that may be filtered according to preset information or data concerning listings previously requested by the first user device, information associated with a listing location, which may include listing parameters such as a proximity to the physical location of a second location, such as a user device location or point-of-interest; whether there is an image or a video clip illustrating the listing location, dimensions of the listing location, an availability time, time remaining for availability, proximity of availability time to another reference time, a type of listing location, such as whether the listing location can accommodate motorcycles, trucks, compact vehicles, and/or the like; dimensions associated with listings, dimensions of vehicles associated with the first user device, information about any hazards, whether or not the listing has a garage, instructions for unlocking a gate or garage, such as a passcode or pattern, information about price and time, such as price per hour, price for various times during a day, price per day, price per week/month/year, relative size of listings, a price range, whether or not the listing location has an over-head cover, such as a roof or carport, whether or not the listing location is an electric vehicle (EV) charging station, past, current, and/or future demand for the listing; a user rating associated with the listing location, such as a one to five star rating, and/or the like, and/or combinations thereof. In some embodiments, GUI 1010 includes a map with GUI object 1012, first listing location 1014, and second listing locations 1016. In some examples, GUI object 1012 may be selected, and in response to the selection of GUI object 1012, a list of items 1020 is displayed, including one or more parameters by which the map of listing locations may be filtered. In some examples, an item from list of items 1020 is selected and an input is entered into a field. In some examples selections are made via user input or automatically without user input. In response to the input, listing locations matching the selected parameters entered in one or more fields of list of items 1020 may be determined. In response to the determination, listing locations within a map region are displayed on GUI 1010. The map region may correspond with the current map frame or may correspond with a certain radius from a current location of a media device included in system 1000.

In some embodiments, an item from list of items 1020 corresponding to price range is selected. A price range of $3-$5 is entered into a field corresponding to the selected item. A plurality of listing locations displayed on the map is filtered according to the selected price range. In some examples, first listing location 1014 has an associated price within the selected price range, and second listing locations 1016 do not have an associated price within the selected price range. As a result, second listing locations 1016 are not displayed on the map, and only first listing location 1014 and other listing locations with associated prices within the selected price range are displayed on the map. Other parameters and scenarios for filtering listing locations that may be displayed on the media device of system 1000 are within the scope of disclosed embodiments.

Figure 11:
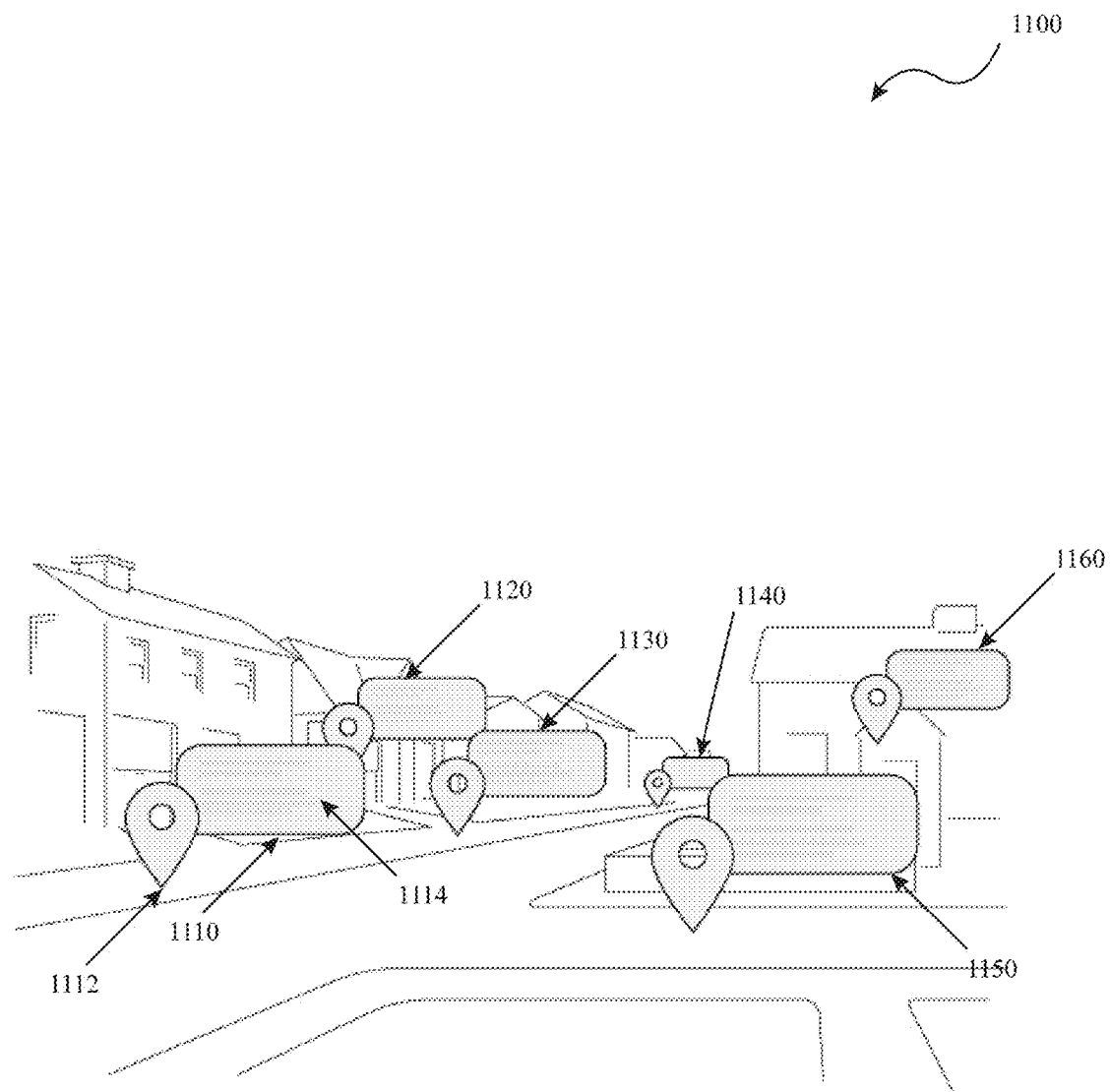
FIG. 11 is another example view of an augmented reality system.

FIG. 11 is another example view 1100 of an augmented reality system, that may correspond to augmented reality system 900, displayed on a media device. In some examples, the media device may correspond to one or more of computing devices 110, 140, 170, media device 210, vehicle media device 220, wireless media device 306, and/or media device 910, and may include one or more sensors, such as sensors discussed above with respect to FIG. 2. In some examples, view 1100 includes a GUI of the camera view in a first direction of a camera of the media device, overlaid with images or videos illustrating the listing location, or other GUI objects in location areas corresponding to listing locations. In some examples, a plurality of listing locations is displayed as GUI objects, including GUI object 1110, GUI object 1120, GUI object 1130, GUI object 1140, GUI object 1150, and GUI object 1160. In some examples, what GUI objects are displayed may be filtered according to preset information or data concerning listings previously requested by the first user device, information associated with a listing location, which may include listing parameters such as a proximity to the physical location of a second location, such as a user device location or point-of-interest; whether there is an image or a video clip illustrating the listing location, dimensions of the listing location, an availability time, time remaining for availability, proximity of availability time to another reference time, a type of listing location, such as whether the listing location can accommodate motorcycles, trucks, compact vehicles, and/or the like; dimensions associated with listings, dimensions of vehicles associated with the first user device, information about any hazards, whether or not the listing has a garage, instructions for unlocking a gate or garage, such as a passcode or pattern, information about price and time, such as price per hour, price for various times during a day, price per day, price per week/month/year, relative size of listings, a price range, whether or not the listing location has an over-head cover, such as a roof or carport, whether or not the listing location is an electric vehicle (EV) charging station, past, current, and/or future demand for the listing; a user rating associated with the listing location, such as a one to five star rating, and/or the like, and/or combinations thereof. The GUI objects displayed may enable a user to see listing locations that would otherwise be obscured from view. In some examples, GUI object 1160 is behind a building structure, such as a house, or an elevation in the earth's surface, such as a hill.

In some embodiments, GUI objects may include tags, images, videos, and details about respective listing locations, including preset information or data concerning listings previously requested by the first user device, information associated with a listing location, which may include listing parameters such as a proximity to the physical location of a second location, such as a user device location or point-of-interest; an image or a video clip illustrating the listing location, time remaining for availability, dimensions of the listing location, an availability time, proximity of availability time to another reference time, a type of listing location, such as whether the listing location can accommodate motorcycles, trucks, compact vehicles, and/or the like; dimensions associated with listings, dimensions of vehicles associated with the first user device, information about any hazards, whether or not the listing has a garage, instructions for unlocking a gate or garage, such as a passcode or pattern, information about price and time, such as price per hour, price for various times during a day, price per day, price per week/month/year, relative size of listings, a price range, whether or not the listing location has an over-head cover, such as a roof or carport, whether or not the listing location is an electric vehicle (EV) charging station; past, current, and/or future demand for the listing; a user rating associated with the listing location, such as a one to five star rating, and/or the like, and/or combinations thereof. In some examples, GUI object 1110 includes a location tag 1112 corresponding to a physical location of a first listing location. In some examples, GUI object 1110 includes a field with details 1114 about the first listing location. In some examples, details 1114 includes a name of the first listing location, a distance of 100 feet, a user rating of three stars, and some notes about the listing location, including for instance whether a code or password is needed to park a vehicle at the listing location.

Some advantages of disclosed embodiments include enabling a user to view details about respective listing locations in a 360 view, creating a more efficient method of presenting listing locations that may be suitable for the user's needs. In some examples, the user drives an expensive vehicle, and is concerned about the vehicle's safety while it is parked. The user may utilize an application installed on a smart device, the application being coupled to a database of listing locations, including the augmented reality system 900, 1000, or 1100. The user may use the application on the smart device to scan for parking spaces that are covered or are in a secure area and have a high user rating, and observe images or videos illustrating the listing location. The user may filter the search to populate the view with parking spaces that match the user's selected criteria and select a parking space that is desirable.

As discussed above and further emphasized here, FIGS. 1-11 are merely examples, and should not unduly limit the scope of the claims. Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions, subject matter disclaimers, or disavowals provided in the documents are not incorporated by reference unless expressly included herein. In the event of inconsistent usages between this document and those documents so incorporated by reference, the usage in the incorporated reference(s) should be considered supplementary to that of this document; for irreconcilable inconsistencies, the usage in this document controls.

What is claimed is:

1. A system, comprising:
   a non-transitory memory;
   one or more processors coupled to the non-transitory memory and configured to execute instructions to perform operations comprising:
   monitoring sensor data and location data associated with a user device, the user device including one or more sensors;
   monitoring traffic data associated with a location of the user device based on the sensor data and the location data;
   matching a user profile that comprises a plurality of factors to real-time user data, wherein the real-time user data includes the sensor data, the location data, historical user data, traffic data, and a location of the user device moving from higher order roads to lower order roads;
   when it is determined that a user-selectable message is to be provided to the user device based on the matching, providing the user-selectable message on the user device, the user-selectable message comprising a prompt configured to transmit a search request for a listing location of one or more listing locations;
   receiving the search request in response to the user-selectable message, the search request including search parameters associated with the one or more listing locations; and
   providing instructions causing a vehicle to autonomously directed move to a first listing location of the one or more listing locations.

2. The system of claim 1, wherein the user-selectable message includes a deep link.

3. The system of claim 2, wherein the deep link is configured to be activated by audio confirmation or touch of a display of the user device.

4. The system of claim 1, wherein the determination to provide the user-selectable message on the user device is based on machine learning and artificial intelligence.

5. The system of claim 1, wherein the determination to provide the user-selectable message on the user device is further based on a frequency of the vehicle braking and a frequency of the vehicle turning.

6. The system of claim 1, wherein the determination to provide the user-selectable message on the user device is based on a plurality of factors, the plurality of factors being weighed based on a driver profile or the historical user data.

7. A computer-implemented method for determining when a vehicle operator is searching for a listing location, comprising:

monitoring, using one or more processors coupled to a non-transitory memory, sensor data and location data associated with a user device, the user device including one or more sensors;

monitoring traffic data associated with a location of the user device based on the sensor data and the location data;

matching a user profile that comprises a plurality of factors to real-time user data, wherein the real-time user data includes the sensor data, the location data, historical user data, traffic data, and a location of the user device moving from higher order roads to lower order roads;

when it is determined that a user-selectable message is to be provided on the user device based on the matching, providing the user-selectable message on the user device, the user-selectable message comprising a prompt configured to transmit a search request for a listing location of one or more listing locations;

receiving the search request in response to the user-selectable message, the search request including search parameters associated with the one or more listing locations; and providing instructions causing a vehicle to autonomously move to a first listing location of the one or more listing locations.

8. The computer-implemented method of claim 7, wherein the user-selectable message includes a deep link.

9. The computer-implemented method of claim 8, wherein the deep link is configured to be activated by audio confirmation or touch of a display of the user device.

10. The computer-implemented method of claim 7, wherein the determination to provide the user-selectable message on the user device is based on machine learning and artificial intelligence.

11. The computer-implemented method of claim 7, wherein the determination to provide the user-selectable message on the user device is further based on a frequency of the vehicle braking and a frequency of the vehicle turning.

12. The computer-implemented method of claim 7, wherein the determination to provide the user-selectable message on the user device is further based on the user device is near one or more listing locations based on the location data of the user device.

13. The computer-implemented method of claim 7, wherein the user-selectable message provided to the user device is a notification, alert, update, text message, or chime.

14. The computer-implemented method of claim 7, wherein the determination to provide the user-selectable message on the user device is further based on a vehicle speed relative to an average traffic speed and a posted speed limit, the posted speed limit corresponding with a speed limit on a direction of travel of the user device.

15. A user device, comprising:
a non-transitory memory;
one or more processors coupled to the non-transitory memory and configured to execute instructions to perform operations comprising:
monitoring sensor data and location data associated with the user device, the user device including one or more sensors;
monitoring traffic data associated with a location of the user device based on the sensor data and the location data;
matching a user profile that comprises a plurality of factors to real-time user data, wherein the real-time user data includes the sensor data, the location data, historical user data, traffic data, and a location of the user device moving from higher order roads to lower order roads;
providing a user-selectable message on the user device based on the matching, the user-selectable message comprising a prompt configured to transmit a search request for a listing location of one or more listing locations;
transmitting the search request in response to activation of the prompt, the search request including search parameters associated with the one or more listing locations; and
generating instructions causing a vehicle to autonomously move to a first listing location of the one or more listing locations.

16. The user device of claim 15, wherein the user-selectable message includes a deep link.

17. The user device of claim 16, wherein the deep link is configured to be activated by audio confirmation or touch of a display of the user device.

18. The user device of claim 15, wherein the search parameters include one or more of a user rating, a price range, a time range, a type of listing location, and proximity of availability time to a current time.

19. The user device of claim 15, wherein providing the user-selectable message on the user device is further based on a frequency of the vehicle braking and a frequency of the vehicle turning.

20. The user device of claim 15, wherein providing the user-selectable message on the user device is further based on whether a weighted sum of factors associated with vehicular movement exceeds a threshold.

* * * * *